(12) United States Patent
Hu et al.

(10) Patent No.: US 11,498,129 B2
(45) Date of Patent: Nov. 15, 2022

(54) METHODS FOR SYNTHESIZING SILVER NANOPLATES AND NOBLE METAL COATED SILVER NANOPLATES AND THEIR USE IN TRANSPARENT FILMS FOR CONTROL OF LIGHT HUE

(71) Applicant: C3Nano Inc., Hayward, CA (US)

(72) Inventors: Yongxing Hu, Fremont, CA (US); Alexander Seung-il Hong, San Mateo, CA (US); Ying-Syi Li, Fremont, CA (US); Xiqiang Yang, Hayward, CA (US); Yadong Cao, San Jose, CA (US); Ajay Virkar, San Mateo, CA (US)

(73) Assignee: C3 Nano, Inc., Hayward, CA (US)

( * ) Notice: Subject to any disclaimer, the term of this patent is extended or adjusted under 35 U.S.C. 154(b) by 0 days.

(21) Appl. No.: 17/132,327

(22) Filed: Dec. 23, 2020

(65) Prior Publication Data
US 2021/0142926 A1    May 13, 2021

Related U.S. Application Data

(62) Division of application No. 16/174,433, filed on Oct. 30, 2018, now Pat. No. 10,902,965, which is a
(Continued)

(51) Int. Cl.
*B22F 9/24* (2006.01)
*C22B 3/44* (2006.01)
(Continued)

(52) U.S. Cl.
CPC ............... *B22F 9/24* (2013.01); *B22F 1/054* (2022.01); *B22F 1/0545* (2022.01); *B22F 1/0551* (2022.01); *B22F 1/17* (2022.01); *C22B 3/44* (2013.01); *C22B 11/04* (2013.01); *H01B 1/02* (2013.01); *H01B 1/16* (2013.01); *H01B 1/22* (2013.01); *Y02P 10/20* (2015.11)

(58) Field of Classification Search
None
See application file for complete search history.

(56) References Cited

U.S. PATENT DOCUMENTS

| 6,274,412 B1 | 8/2001 | Kydd et al. |
| 7,316,741 B2 | 1/2008 | Baldi et al. |
| (Continued) | | |

FOREIGN PATENT DOCUMENTS

| CN | 102365127 A | 2/2012 |
| CN | 105140341 A | 12/2015 |
| (Continued) | | |

OTHER PUBLICATIONS

Office Action from corresponding Chinese Application No. 201600775479 dated Mar. 18, 2021.
(Continued)

*Primary Examiner* — Katie L. Hammer
(74) *Attorney, Agent, or Firm* — Christensen, Fonder, Dardi; Elizabeth A. Gallo; Peter S. Dardi

(57) ABSTRACT

Desirable methods for larger scale silver nanoplate synthesis are described along with methods for applying a noble metal coating onto the silver nanoplates to form coated silver nanoplates with a desirable absorption spectrum. The silver nanoplates are suitable for use in coatings for altering the hue of a transparent film. The hue adjustment can be particularly desirable for transparent conductive films.

11 Claims, 19 Drawing Sheets

Related U.S. Application Data division of application No. 14/963,974, filed on Dec. 9, 2015, now Pat. No. 10,147,512.

(51) Int. Cl.

| | |
|---|---|
| B22F 1/17 | (2022.01) |
| B22F 1/054 | (2022.01) |
| B22F 1/0545 | (2022.01) |
| H01B 1/22 | (2006.01) |
| H01B 1/16 | (2006.01) |
| C22B 11/00 | (2006.01) |
| H01B 1/02 | (2006.01) |

(56) References Cited

U.S. PATENT DOCUMENTS

| | | |
|---|---|---|
| 7,554,615 B2 | 6/2009 | Harada et al. |
| 7,585,349 B2 | 9/2009 | Xia et al. |
| 8,031,180 B2 | 10/2011 | Miyamoto et al. |
| 8,049,333 B2 | 11/2011 | Alden et al. |
| 8,478,749 B2 | 7/2013 | Edala et al. |
| 9,150,746 B1 | 10/2015 | Li et al. |
| 9,183,968 B1 | 11/2015 | Li et al. |
| 2001/0002275 A1 | 5/2001 | Oldenburg et al. |
| 2006/0192486 A1 | 8/2006 | Ogawa |
| 2008/0241262 A1 | 10/2008 | Lee et al. |
| 2008/0259262 A1 | 10/2008 | Jones et al. |
| 2008/0295646 A1 | 12/2008 | Mirkin et al. |
| 2010/0028554 A1 | 2/2010 | Ogawa et al. |
| 2010/0072434 A1 | 3/2010 | Lee et al. |
| 2010/0243295 A1 | 9/2010 | Allemand et al. |
| 2010/0261827 A1 | 10/2010 | Peri et al. |
| 2011/0039078 A1 | 2/2011 | Brennan Fournet et al. |
| 2012/0073947 A1 | 3/2012 | Sakata et al. |
| 2012/0101007 A1 | 4/2012 | Ahern et al. |
| 2012/0132930 A1 | 5/2012 | Young et al. |
| 2012/0183768 A1 | 7/2012 | Kondo et al. |
| 2012/0283336 A1 | 11/2012 | Grigorenko et al. |
| 2013/0341074 A1 | 12/2013 | Virkar et al. |
| 2013/0342221 A1 | 12/2013 | Virkar et al. |
| 2014/0005295 A1 | 1/2014 | Argwal et al. |
| 2014/0105982 A1 | 4/2014 | Oldenburg et al. |
| 2014/0120168 A1 | 5/2014 | Oldenburg et al. |
| 2014/0162067 A1 | 6/2014 | Shajamali et al. |
| 2014/0238833 A1 | 8/2014 | Virkar et al. |
| 2015/0072066 A1 | 3/2015 | Karandikar et al. |
| 2015/0144380 A1 | 5/2015 | Yang et al. |
| 2016/0096967 A1 | 4/2016 | Virkar et al. |
| 2016/0108256 A1 | 4/2016 | Yang et al. |
| 2016/0122562 A1 | 5/2016 | Yang et al. |
| 2016/0369104 A1 | 12/2016 | Gu et al. |

FOREIGN PATENT DOCUMENTS

| | | |
|---|---|---|
| JP | 2012-521491 A | 9/2012 |
| KR | 10-2009-0066704 A | 6/2009 |
| KR | 10-2012-0133522 A | 12/2012 |

OTHER PUBLICATIONS

Office Action from corresponding Japanese Application No. 2018-530051 dated Jun. 8, 2021.

Aherne et al., "Etching-Resistant Silver Nanoprisms by Epitaxial Deposition of a Protecting Layer of Gold at the Edges" Langmuir. (2009); 25 (17), pp. 10165-10173; DOI: 10.1021/la9009493.

Brongersma, "Nanoscale photonics: Nanoshells: gifts in a gold wrapper," Nature Materials, May 2003, 2(5):296-297.

Cavalcante et al., "Colour Performance of Ceramic Nanopigments," Dyes and Pigments, (2009), 80, 226-232.

ChemicalBook, Methyl methacrylate Basic Information, Dec. 2008, p. 1-2.

Chen et al., "Contollable colours and shapes of silver nanostructures based on pH: application to surface-enhanced Raman scattering," Nanotechnology, 18(32):325602, (Jul. 2007).

Gao et al., "Highly Stable Silver Nanoplates for Surface Plasmon Resonance Biosensing," Angewandte Chemie International Edition, (2012), 51:5629-5633.

Georgia Institute of Technology © 2013, "Synthesis and Stability of Silver Nanoplates," National Nanotechnology Infrastructure Network.

Jiang et al., "Ultrasonic-Assisted Synthesis of Monodisperse Single-Crystalline Silver Nanoplates and Gold Nanorings," Inorganic Chemistry, (2004), 43:5877-5885.

Kah et al., "Synthesis of gold nanoshells based on the deposition precipitation process," Gold Bulletin (2008), 41/1, 23-36.

Kelly et al., "Triangular Silver Nanoparticles: Their Preparation, Functionalisation and Properties," Acta Physica Polonica A, (2012), 122(2), 337-345.

Liu et al., entitled "One-Step Growth of Triangular Silver Nanoplates with Predictable Sizes on a Large Scale," Nanoscale, (2014), 6:4513-4516 (see supplemental materials).

Mock et al., "Shape effects in plasmon resonance of individual colloidal silver nanoparticles," Journal of Chemical Physics, (2002), 116(15), 6755-6759.

National Institute of Standards and Technology (NIST), Basic Atomic Spectroscopic Data (Silver), Dec. 1995 9according to ref. E95), p. 1.

Oldenburg et al., "Nanoengineering of optical resonances," Chemical Physics Letters, (1998), 228:243-247.

Rangappa et al., "Transparent CoAl2O4 hybrid nano pigment by organic ligand-assisted supercritical water," Journal of the American Chemical Soceity, (2007), 129(36):11061-11066.

Si et al., "Synthesis of PSS-capped triangular silver nanoplates with tunable SPR," Colloids and Surfaces A: Physicochemical and Engineering Aspects, (2011), 380, 257-260.

Sun et al., "Gold and Silver Nanoparticles: A class of chromophores with colors tunable in the range from 400 to 750 nm," Analyst, (2003), 128, 686-691.

Tharion et al., "Glucose mediated synthesis of gold nanoshells: A facile and eco-friendly approach conferring high colloidal stability," Royal Society of Chemistry Advances, (2014), 4, 3984-3991.

Tsuji et al., "Rapid Transformation from Spherical Nanoparticles, Nanorods, Cubes, or Bipyramids to Triangular Prisms of Silver with PVP, Citrate, and H2O2" Langmuir (2012) 28 (24), pp. 8845-8861 (DOI: 10.1021/la3001027).

Xiong et al., "Poly(vinyl pyrrolidone): a dual functional reductant and stabilizer for the facile synthesis of noble metal nanoplates in aqueous solutions," Langmuir 2006 (20):8563-8570.

Yu et al., "Thermal Synthesis of Silver Nanoplates Revisited: A Modified Photochemical Process," ACS Nano, (2014), 8(10):10252-10261.

Zeng et al., "A Mechanistic Study on the Formation of Silver Nanoplates in the Presence of Silver Seeds and Citric Acid or Citrate Ions," Chemistry an Asian Journal, (2011), 6, 376-379.

Zhang Ei Al., "A Systematic Study of the Synthesis of Silver Nanoplates: Is Citrate a "Magic" Reagent?" Journal of the American Chemical Society, (2011), 133:18931-18939.

Zhang et al., "Citrate-Free Synthesis of Silver Nanoplates and the Mechanistic Study," ACS Applied Materials and Interfaces, (2013), 5:6333-6345.

International Search Report and Written Opinion for co-pending application PCT/US2016/5064558 dated Feb. 17, 2017 (11 pages).

Office Action from corresponding Taiwan Application No. 105140805 dated Jun. 5, 2020.

METHODS FOR SYNTHESIZING SILVER NANOPLATES AND NOBLE METAL COATED SILVER NANOPLATES AND THEIR USE IN TRANSPARENT FILMS FOR CONTROL OF LIGHT HUE

CROSS REFERENCE TO RELATED APPLICATIONS

This application is a divisional of U.S. patent application Ser. No. 16/174,433 filed on Oct. 30, 2018 to Hu et al., entitled "Methods for Synthesizing Silver Nanoplates and Noble Metal Coated Nanoplates and Their use in Transparent Films for Control of Light Hue," which is a divisional of U.S. patent application Ser. No. 14/963,974 filed on Dec. 9, 2015 to Hu et al., now U.S. Pat. No. 10,147,512 B2, entitled "Methods for Synthesizing Silver Nanoplates and Noble Metal Coated Nanoplates and Their use in Transparent Films for Control of Light Hue," both of which are incorporated herein by reference.

FIELD OF THE INVENTION

The invention relates to improve stabilized silver nanoplates, the large scale stable synthesis of silver nanoplates, noble metal coated silver nanoplates with desirable absorption characteristics and the synthesis of a noble metal coating on silver nanoplates.

BACKGROUND OF THE INVENTION

Transparent polymer films are used in a wide range of products, such as electronic displays. Functional transparent films can provide desired functionality, such as transparent electrically conductive films. For example, electrically conductive films can be important for the dissipation of static electricity when static can be undesirable or dangerous. Optical films can be used to provide various functions, such as polarization, anti-reflection, phase shifting, brightness enhancement or other functions. High quality displays can comprise one or more optical coatings. Based on a variety of applications, the visual appearance, such as color, transparency, haze and the like, can be significant aspects of transparent polymer films.

Transparent conductors can be used for several optoelectronic applications including, for example, touch-screens, liquid crystal displays (LCD), flat panel displays, organic light emitting diode (OLED), solar cells and smart windows. Historically, indium tin oxide (ITO) has been the material of choice due to its relatively high transparency at reasonable electrical conductivities. There are however several shortcomings with ITO. For example, ITO is a brittle ceramic which generally is deposited using sputtering, a fabrication process that involves high temperatures and vacuum and therefore can be relatively slow. Additionally, ITO is known to crack easily on flexible substrates.

SUMMARY OF THE INVENTION

In a first aspect, the invention pertains to a method for synthesizing silver nanoplates, the method comprising the step of gradually adding a second quantity of hydrogen peroxide to an aqueous solution of a blend of silver ions, a polycarboxylate anion, a polyfunctional hydroxide compound, a first quantity of hydrogen peroxide and a reducing agent under mixing conditions. Generally, the aqueous solution can have a silver ion concentration from about 0.00025 M to about 0.1M, and a molar ratio of the total hydrogen peroxide to reducing agent can be from about 10 about 120.

In a further aspect, the invention pertains to a dispersion of silver nanoplates having an average equivalent circular diameter of no more than about 120 nm free of polymer capping agent and/or an inorganic coating and having a stability for at least 21 days of dark storage under ambient conditions as determined by a shift of peak absorption spectrum wavelength by no more than about 40 nm.

In another aspect, the invention pertains to a dispersion of noble metal coated silver nanoplates having at least about 5 weight percent noble metal and having an absorption of light at 600 nm that is at least about 0.6 normalized absorption units, and the corresponding silver nanoplates without a noble metal coating also having an absorption of light at 600 nm that is at least about 0.6 normalized absorption units.

In other aspects, the invention pertains to a method for applying a noble metal coating onto a silver nanoplate, the method comprising the step of adding gradually a coating solution comprising an aqueous solution of complexed noble metal ions and a polymer capping agent to a reaction solution comprising an aqueous dispersion of silver nanoplates, a polycarboxylate anion, a polymer capping agent, a ligand, and a reducing agent. Generally, the total concentration of silver in all forms can be at least about 0.75 mM.

DETAILED DESCRIPTION OF THE INVENTION

Figure 1:
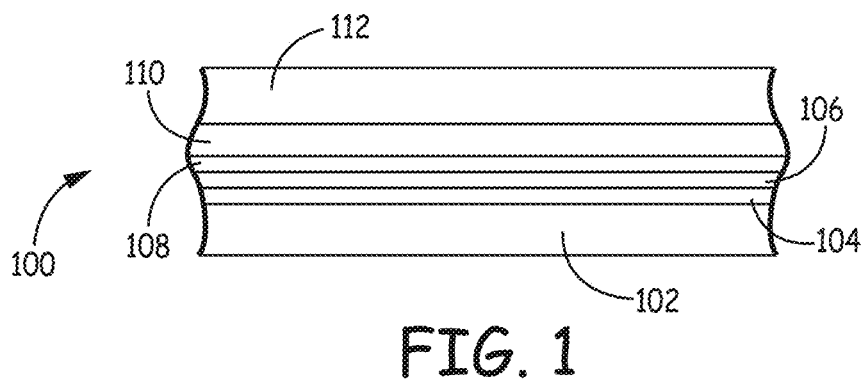
FIG. 1 is a fragmentary side view of a film with a sparse metal conductive layer and various additional transparent layers on either side of the sparse metal conductive layer.

It has been found that nanoscale colorants can be used to control the hue of light transmissions through a transparent conductive film without significantly altering the total light transmission, haze or the electrical conductivity of the film. In particular, metal nanoplates have been engineered to produce particular colors based on surface plasmon resonances. Synthesis methods for forming stabilized silver nanoplates, optionally with a noble metal, e.g. gold, coating, are described herein for forming commercial quantities of the nanoplates. Synthesis procedures have been discovered successfully based on either increasing the concentrations of the reacting solutions and/or increasing the overall volume, without undesirable changes to the nanoplate morphology or stability. The application of a noble metal coating can be accomplished in large scale without undesirable changes in the color of the coated nanoplates. In some embodiments, the silver nanoplates functioning as colorants can be incorporated with a polymer binder into an electrically conductive layer and/or into a coating layer. The silver nanoplates can compensate at least partially for colors in the transmission through the transparent conductive film due to the electrically conductive elements and/or can introduce a desired hue to the film. In particular, the transparent conductive films can be formed effectively from metal nanowires and/or from fused metal nanostructured networks, although in additional or alternative embodiments other transparent conductive materials such as appropriate metal oxides can be used. In some embodiments, the nanoscale colorants can improve the whiteness of light transmission through a nanowire-based conductive layer without significantly increasing haze or decreasing light transmission.

Improved synthesis approaches are described herein that can be used to produce nanoplates with absorption spectra that are effective to produce a whiter color from silver nanowire based conductive films. Also, noble metal coated silver nanoplates are synthesized for incorporation into films with a high stability over time. The noble metal coatings can be applied in a stable deposition process that forms a uniform noble metal coating over the silver nanoplates. The noble metal coated silver nanoplates can be incorporated into a coating over a sparse metal conductive layer with desirable results, as shown in the Examples below. With respect to modification of hue/color and incorporation of metal nanoplates in corresponding films, a reference to silver nanoplates also includes noble metal coated nanoplates unless explicitly excluded.

Color spaces can be defined to relate spectral wavelengths to human perception of color. CIELAB is a color space determined by the International Commission on Illumination (CIE). The CIELAB color space uses a three-dimensional set of coordinates, L*, a* and b*, where L* relates to the lightness of the color, a* relates to the position of the color between red and green, and b* relates to the position of the color between yellow and blue. The "*" values represent normalized values relative to a standard white point. As described below, these CIELAB parameters can be determined using commercial software from measurements made in a spectrophotometer.

Transparent conductive films can be formed from various nanomaterials, such as carbon nanotubes, metal nanowires and the like. Also, conductive metal oxides can be used to form conductive films, such as indium tin oxide (ITO), aluminum-doped zinc oxide (AZO) and the like. Conductive metal oxides can be formed as conductive layers or possibly as particulates in a layer with a polymer binder. With respect to silver nanowires for transparent conductive films, generally the use of longer and thinner nanowires results in better electrical conductivity for a given optical transparency and clarity. However, it has been observed that some films formed with thinner silver nanowires can appear yellowish.

It has been discovered that the color of the transparent conductive films can be made less yellow, i.e., smaller absolute value of b*, through the incorporation of metal nanoplates, metal nanoshells, nanoribbons, or other nanoscale colorants, e.g., pigments. Nanoplates can be tuned for specific color properties based on surface plasmon resonances, and other nanoscale colorants can be selected based on their color and low contributions to decreases in total transmission. Metal nanostructures can be coated with polymer, different metals and/or nonmetal compositions, such as silica. Synthesis methods are described herein for the effective coting with noble metals, such as Pt, Pd, Jr, Rh, Ru, Os or combinations thereof. Small amounts of the nanoscale colorants can be incorporated into the films to modify the overall color properties without in some embodiments significantly lowering the total transmission and/or increasing the haze. It has been discovered that certain size ranges and types of nanoplates and nanoshells can even lower the haze. In particular, the silver nanoplates, nanoshells or other nanoscale elements can compensate for color distortion introduced by electrically conductive elements in the film to produce whiter transmitted light. In other embodiments, correspondingly a desired color hue can be introduced to the transmitted light using selected nanoscale elements, if desired. The discussion herein focuses on producing whiter light, but it will be understood by a person of ordinary skill in the art that the introduction of a desired hue of transmitted light can be introduced through the introduction of selected nanoscale colorants while forming a transparent film generally with a total transmittance of visible light of at least about 85% in some embodiments. In appropriate embodiments, the nanoscale particulates can be effectively incorporated into an electrically conductive layer, a coating layer or both. The general use of nanoscale colorants for control of hue are described in copending U.S. patent application Ser. No. 14/627,400 to Yang et al., now published U.S. patent application 2016/0108256, entitled "Transparent Films with Control of Light Hue Using Nanoscale colorants," incorporated herein by reference.

As described herein, color adjusted coatings can be formed with a modest drop in total transmission of visible light. Various polymers can be introduced as binders with relatively good mechanical strength to provide a good high transparency matrix. Generally, the coatings can be formed with small thicknesses while providing desired color adjustment. In some embodiments, small thicknesses can be desirable for use adjacent transparent conductive layers since electrical conductivity can be maintained through the thin overcoats. Thus, with coatings having average thicknesses of no more than about 100 microns and in some embodiments no more than a micron desirable levels of color adjustment can be obtained.

Good coating properties generally involve the formation of a good dispersion of the silver nanoplates within a solution of the matrix polymer so that the resulting coating has reduced effects of clumps of particulates. The silver nanoplates generally can be incorporated into a relatively smooth thin coating and so that the particles do not alter the optical properties more than desired. In general, the coatings have a silver nanoplates loading of no more than about 30 weight percent. The concentrations of polymer binder and silver nanoplates in a coating solution can be adjusted to yield desirable coating properties for the solution, such as viscosity, and thickness of the final coating. The ratio of concentration of solids in the coating solution can be adjusted to yield the coating concentrations desired once the coating is dried. The polymer component of the coating generally can be crosslinked with UV radiation or other means appropriate for the polymer binder to further strengthen the coating.

In general, the silver nanoplates can be introduced into a passive protective coating and/or directly into a transparent conductive layer. Passive transparent protective coatings may or may not be used to cover a transparent conductive layer. A common feature for these coatings is the compatibility of the components in a coating solution as well as in the resulting composite material. Compatibility refers to the ability to effectively disperse into a relatively uniform material without an unacceptable degree of aggregation of the components, such as with clumping. In particular, the compatibility can allow for good distribution of the materials within the coating solutions to provide for formation of a reasonably uniform composite material forming the coating. A more uniform composite material is believed to contribute to desirable optical properties of the coating, such as good transparency and low haze.

For the passive coatings, the coating solutions can comprise a solvent, dissolved matrix polymer, nanoscale colorants, possible combinations thereof and optional additional components. A range of matrix polymers can be used that are suitable for transparent films, as described below. Wetting agents, such as surfactants, can be used as well as other processing aids. In general, the solvents can comprise water, organic solvents or suitable mixtures thereof. For the active coatings, the coating solutions generally further comprise components that contribute to the active functionality, such as metal nanowires for contributing electrical conductivity.

Nanoplates have an average thickness of no more than 100 nm and two other dimensions that may or may not be greater than 100 nm. Metal nanoplates have been synthesized using solution based techniques and their optical properties have been examined. See, for example, published U.S. patent applications 2012/0101007 to Ahern et al., entitled "Silver Nanoplates," and 2014/0105982 to Oldenburg et al., entitled "Silver Nanoplate Compositions and Methods," both of which are incorporated herein by reference. Silver nanoplates with tuned absorption properties based on surface plasmon resonances are available commercially from nanoComposix, Inc., San Diego, Calif., USA, Beijing Nanomeet Technology Co. Ltd., China, and Suzhou ColdStones Technology Co., Ltd., China. Similarly, nanoplates can be synthesize directly, such as using known synthesis techniques, as for example, Kelly, J. M., et al., ACTA PHYSICA POLONICA A, (2012), 122, 337-345, "Triangular Silver Nanoparticles: Their Preparation, Functionalisation and Properties"; Jiang, Li-Ping, et al., Inorg. Chem., (2004), 43:5877-5885, "Ultrasonic-Assisted Synthesis of Monodisperse Single-Crystalline Silver Nanoplates and Gold Nanorings"; and Xiong, Y., et al., Langmuir 2006 (20):8563-8570, "Poly(vinyl pyrrolidone): a dual functional reductant and stabilizer for the facile synthesis of noble metal nanoplates in aqueous solutions," all three of which are incorporated herein by reference. As reported by nanoComposix, the silver nanoplates have thicknesses of about 10 nm and respectively (equivalent circular) diameters of 40-60 nm (550 nm nanoplates) or 60-80 nm (650 nm nanoplates), which are particularly useful for correcting the yellowness of a coating. Some commercial nanoplates can be obtained with either a polyvinylpyrrolidone (PVP) coating or with a silica (silicon oxide) coating.

An improved synthesis approach is described that is effective to synthesize nanoplates using a higher concentration during the synthesis and with desirable visible absorption of the product nanoplates. Specifically, the nanoplate synthesis involves using significantly higher reactant concentrations that can be effectively used to produce commercial quantities of silver nanoplates. The high production synthesis can be performed consistent with the production of nanoplates with desirable absorption properties. The formation of nanoplates is guided to a significant degree with the use of a multifunctional carboxylic acid. Stabilization is provided with a C3 or larger alcohol having additional alcohol or other selected functional groups, such as glycerol, lactate, propylene glycol and the like, provides for effective scale up in a one step process as well as stabilizing the nanoplates themselves. Reduction of silver ions is driven by sodium borohydride or the like. Also, a peroxide compound is added in a two-step gradual addition process to stabilize the high concentration synthesis. The stabilization with the alcohol-based compound provides surprising improvement since the multifunctional carboxylic acid already complexes with the silver ions and can coat the surface of the nanoplates. The synthesis of the nanoplates inherently involves a balance of conditions and stabilizing compounds since the nanoplates themselves are not thermodynamically stable relative to transitions to nanoparticles or other structures, and that directed nanostructure growth combined with stabilization through the process provide for the synthesis of larger quantities of the product nanoplates.

In the synthesis of silver nanoplates, citrate has been found to be a valuable ion in the solution to guide the formation of the nanoplate structure. Other multicarboxylate anions have been also found to successfully guide successful nanoplate formation, and in addition to citrate, succinate and citramalate have been also found to be particularly effective, as described in Zhang et al., "A Systematic Study of the Synthesis of Silver Nanoplates: Is Citrate a "Magic" Reagent?" Journal of the American Chemical Society, 2011, 133:18931-18939, incorporated herein by reference (hereinafter "Zhang JACS"). But non-citrate based synthesis of nanoplates using polyvinylpyrollidone with the application of heat has also been accomplished, as described in Zhang et al., "Citrate-Free Synthesis of Silver Nanoplates and the Mechanistic Study," ACS Applied Materials and Interfaces, 2013, 5:6333-6345, incorporated herein by reference. A scale-up procedure has been described using a separate seed (Ag nanoparticles) formation step, as described in Liu et al., entitled "One-Step Growth of Triangular Silver Nanoplates with Predictable Sizes on a Large Scale," Nanoscale, 2014, 6:4513-4516 (see supplemental materials), incorporated by reference with supplemental materials. In contrast, the scale up procedure described herein does not involve a seed particle step.

An effective method for the formation of a noble metal coating onto silver nanoplates is described herein. In the coating method, a dispersion is formed with the silver nanoplates, capping agents, ligands and a mild reducing agent. A solution with noble metal ions, a capping agent and a complexing reagents is gradually added to form the coating. Since noble metal ion complexes can be readily reduced, a mild reducing agent, such as ascorbic acid, oxalic acid, tartaric acid, hydroxyl amines, formic acid or mixtures thereof, is effective to drive the coating process. It has been found that appropriate multifunctional carboxylic anions, such as citrate, along with polyvinylpyrrolidone are effective together to form desired coated nanoplates, and gold coatings are exemplified below. It has been found that the presence of the citrate or other suitable multifunctional carboxylate or a combination thereof, alters the absorption spectrum of the coated nanoplates by reducing the spectral blue shift associated with the coating process, which provides desirable features to the nanoplates as hue altering polymer fillers.

The gold coating of silver nanoplates is described in Gao et al., "Highly Stable Silver Nanoplates for Surface Plasmon Resonance Biosensing," Angewandte Chemie International Edition, 2012, 51:5629-5633, incorporated herein by reference (hereinafter "Gao 2012"). In this article, the silver nanoplates were synthesized starting with silver seeds that were subsequently used to synthesize the nanoplates. Effective synthesis approaches are described in the present application that can be performed at large scale for the delivery of smooth coatings with effective thicknesses based on distinctions from the Gao approach.

Transparent electrically conductive films have been formed with silver nanowires or fused metal nanostructured networks having a low surface resistance, with good optical transparency and with low haze. These films though can be observed in some embodiments to have a slight yellow tint, which corresponds in the CIELAB scale of a positive value of b*. It has been discovered that the inclusion of a small amount of nanoscale colorant, such as silver nanoplates, can improve the hue to more of a neutral gray color, with the reduction of b*. A parameter L* provides the range from black to white along a neutral gray scale. Silver nanoplates though can result in a slight decrease in transparency and a slight increase in the absolute value of a*, but these detrimental effects can generally be small and within acceptable levels.

With respect to the use of silver nanoplates to improve the whiteness of transmitted light through a transparent conductive film, the silver nanoplates can be selected to have a small compensating absorption and/or scattering complementary to the absorption/scattering of the conductive material. Based on the CIELAB parameters, in principle, the films can be engineered to get a desired degree of whiteness, generally based on a small absolute value of b* and a* in the CIELAB scale. However, in view of practical limitations, design of the films can direct the results to produce whiter light within certain desired ranges (absolute values of b* and a* lower than target cutoff values), as has been achieved with silver nanoplates exemplified herein. As explained further below, reasonable values of whiteness can be obtained with acceptable decreases in total transmission of visible light.

Similarly, the silver nanoplates can be selected to introduce a desired hue or color rather than white light. For appropriate embodiments, the intrinsic contribution to the color based on an electrically conductive layer of a transparent conductive film can be factored into the selection of the silver nanoplates and loading of the silver nanoplates to achieve a desired color, which can be expressed by the b* and a* values in the CIELAB system. The selected hues can be patterned appropriately for a particular application, such as a display or the like.

In general, the metal nanoplates can be incorporated into a curable polymer matrix coating material and/or directly into a sparse metal conductive film, which can comprise a polymer binder, such as the curable polymers summarized below, along with metal nanowires and an optional fusing agent. Metal nanoplates in the conductive layer may or may not fuse with and be incorporated into a fused metal nanostructured network. However, in either case, the absorption properties of, for example, metal nanoplates can still be effectively used in the conductive layer to alter the hue of the film. A coating solution can be solution coated, dried, and in some embodiments, cured, for example with UV light, heat curing, other radiation curing or other appropriate crosslinking approach. The thickness of the coating can be selected for the particular application.

Coating/binder polymers suitable for solution coating are commercially available or can be formulated for use. Polymers can be selected for dissolving in aqueous or non-aqueous solvents. Suitable classes of radiation curable polymers and/or heat curable polymers are described further below. The polymer binders can be self-crosslinking upon exposure to radiation, and/or they can be crosslinked with a photoinitiator or other crosslinking agent.

For processing, the silver nanoplates can be dispersed in a coating solution, for example, to form the coating or to form the transparent conductive layer. In some embodiments, a dispersion of nanoplates can be first dispersed and then added to a solution of the other components, such as a polymer binder, metal nanowires, other additives or the like. The concentration of silver nanoplates can be selected to yield a desired loading in the eventual resulting layer formed from the coating solution. Based on concentrations of the coating solution, the wet coating thickness can be selected to yield a desired dry coating thickness based on the empirical decrease in coating thickness upon drying and further processing.

For the formation of transparent electrically conductive layers, various sparse metal conductive layers can be formed from metal nanowires. Metal nanowires can be formed from a range of metals, and metal nanowires are available commercially or can be synthesized. While metal nanowires are inherently electrically conducting, the vast majority of resistance in the metal nanowires based films is believed to due to the junctions between nanowires. Depending on processing conditions and nanowire properties, the sheet resistance of a relatively transparent nanowire film, as deposited, can be very large, such as in the giga-ohms/sq range or even higher. Various approaches have been proposed to reduce the electrical resistance of the nanowire films without destroying the optical transparency.

Films formed with metal nanowires that are processed to flatten the nanowires at junctions to improve conductivity is described in U.S. Pat. No. 8,049,333 to Alden et al., entitled "Transparent Conductors Comprising Metal Nanowires," incorporated herein by reference. Structures comprising surface embedded metal nanowires to increase metal conductivity are described in U.S. Pat. No. 8,748,749 to Srinivas et al., entitled "Patterned Transparent Conductors and Related Manufacturing Methods," incorporated herein by reference. However, desirable properties have been found for fused metal nanostructured networks with respect to high electrical conductivity and desirable optical properties with respect to transparency and low haze. Fusing of adjacent metal nanowires can be performed based on chemical processes at low temperatures under commercially appropriate processing conditions.

In particular, a significant advance with respect to achieving electrically conductive films based on metal nanowires has been the discovery of well controllable processes to form a fused metal network where adjacent sections of the metal nanowires fuse. Fusing of metal nanowires with various fusing sources is described further in published U.S. patent applications 2013/0341074 to Virkar et al., entitled "Metal Nanowire Networks and Transparent Conductive Material," and 2013/0342221 to Virkar et al. (the '221 application), entitled "Metal Nanostructured Networks and Transparent Conductive Material," 2014/0238833 to Virkar et al. (the '833 application), entitled "Fused Metal Nanostructured Networks, Fusing Solutions with Reducing Agents and Methods for Forming Metal Networks," and copending U.S. patent application Ser. No. 14/087,669 to Yang et al. (the '669 application), now published U.S. patent application 2015/0144380, entitled "Transparent Conductive Coatings Based on Metal Nanowires, Solution Processing Thereof, and Patterning Approaches," U.S. Pat. No. 9,183,968 to Li et al, entitled "Metal Nanowire Inks for the Formation of Transparent Conductive Films with Fused Networks," all of which are incorporated herein by reference.

The transparent conductive films generally can comprise several components or layers that contribute to the processability and/or the mechanical properties of the structure without detrimentally altering the optical properties. The sparse metal conductive layers can be designed to have desirable optical properties when incorporated into the transparent conductive films. The sparse metal conductive layer may or may not further comprise a polymer binder. Unless otherwise indicated, references to thicknesses refer to average thicknesses over the referenced layer or film, and adjacent layers may intertwine at their boundaries depending on the particular materials. In some embodiments, the total film structure can have a total transmission of visible light of at least about 85%, a haze of no more than about 2 percent and a sheet resistance of no more than about 250 ohms/sq, although significantly better performance is described herein.

With respect to silver nanoplates, it has been found that the colorants can be added to a sparse metal conductive layer at levels effective to significantly decrease yellowness without significantly sacrificing the other optical properties of the coating. For incorporation into transparent coatings for transparent conductive films or directly into the ink for the formation of a sparse metal conductive layer, suitable quantities of silver nanoplates in an overcoat and/or in the transparent electrically conductive layer generally do not increase the sheet resistance significantly. In some embodiments the sheet resistance increases in films with silver nanoplates relative to the sheet resistance of corresponding unloaded films by no more than about 20%, and similarly the total transmission of visible light in percent can decrease by no more than about 5 in a film with silver nanoplates relative to an unloaded film. Haze may not change significantly due to the presence of silver nanoplates, and in some embodiments silver nanoplates may decease haze somewhat. A reference unloaded film is produced for comparison with the coating solution that has the same concentrations of other components in the solvent and is processed the same way so that the final thickness may be slightly different.

Transparent, electrically conductive films find important applications, for example in solar cells and touch screens. Transparent conductive films formed from metal nanowire components offer the promise of lower processing cost and more adaptable physical properties relative to traditional materials. In a multilayered film with various structural polymer layer(s), the resulting film structure has been found to be robust with respect to processing while maintaining desirable electrical conductivity, and the incorporation of desirable components as described herein can additionally provide stabilization without degrading the functional properties of the film so that devices incorporating the films can have suitable lifetimes in normal use.

Nanoplate Synthesis and Noble Metal Coating

Silver nanoplates and gold-coated silver nanoplates are found to be effective colorants for transparent polymer films. In particular, the gold-coated nanoplates are found to contribute stable hue control for transparent conductive films under established accelerated wear testing. Improved methods are described for the large scale synthesis of silver nanoplates as well as for the noble metal coating of the silver nanoplates. Also, a method is described for the deposit of a noble metal coating that limits the blue spectral absorption shift resulting from the coating so that the noble metal-coated nanoplates are effective to provide hue adjustment for transparent films, such as transparent conductive films based on nanowires. The synthesis approaches are solution based and effective at production of stable uniform nanoplates with significantly more concentrated solutions that are more suitable for the production of commercial quantities of nanoplates.

The synthesis involves an aqueous solution with a soluble silver salt, such as silver nitrate. Nanoplate formation is guided with a small molecular capping agent, in contrast with silver nanowire synthesis that generally involves a moderate molecular weight polymer capping agent. In particular, a citrate salt, such as sodium citrate, has been found to guide the nanoplate shape synthesis with a high degree of specificity. The citrate anion is a tricarboxylate molecule having the formula $(OOCCH_2COH(COO)CH_2COO)^{-3}$. Based on the work of the Yin group (See Zhang JACS cited above), other polycarboxylate anions can effectively substitute for the citrate. As found by Zhang JACS, effective compounds have 2 or 3 carboxylate groups separated by one or two carbon atoms are effective to guide nanoplate synthesis. Anions that are effective to guide approximately 100% nanoplate yield and to stabilize the nanoplated include, for example, citrate, succinate and citramalate, with 80-90% nanoplate yield obtained with malonate, tartrate, ioscitrate, cis-aconate and tricarballylate. These can be referred to as polycarboxylate capping agents, and a mixture of polycarboxylate anions can be used.

Hydrogen peroxide is generally added to further guide the formation of nanoplates. Hydrogen peroxide is a powerful oxidizing agent that can oxidize metallic silver. Upon the addition of the reducing agent, there is a dynamic equilibrium established with the peroxide etchant and reducing agent driving silver metal formation. Zhang JACS postulate the equilibrium results in silver seed formation that ultimately are guided as reactants are consumed into planar growth of the nanoplates based at least in part by the citrate or equivalent polycarboxylate capping agent.

Sodium borohydride is generally used as the reducing agent, although other reducing agents presumably can be substituted, such as hydrazine, $NaBH_4$, $LiAlH_4$, ascorbic acid, oxalic acid, formic acid, combinations thereof, or the like.

For the scale up of the reactions through the use of higher concentrations, the silver nitrate concentrations can be increased by a factor of 2 or more from small scale synthesis, and with appropriate adjustments, silver nanoplates are obtained with high yield and high quality. Results based on a hundred fold or greater increase in reactant concentrations are described in the examples, along with scale up with respect to reactant volumes. Several adjustments in the successful synthesis scale up include the addition of a multifunctional alcohol stabilization agent, an increase of the ratio of hydrogen peroxide to borohydride, and the gradual addition of the hydrogen peroxide. Appropriate concentrations are presented below. The scale up of the reaction and/or increase of reactant concentrations without these modifications generally results in nanoparticle synthesis and apparent destabilization of the nanoplates.

A multifunctional alcohol has been found to stabilize the resulting silver nanoplates. In addition, the multifunctional alcohols have also provided the ability to scale up the silver nanoparticle synthesis through the increase of silver ion concentration. The multifunctional alcohols can be represented by the formula $R_1C(OH)R_2R_3$ where $R_1$ is a moiety with a hydroxyl group ester group, ketone group, heterocyclic group, amino group, amide group, ether group, aldehyde group, carboxylic acid group, or a plurality thereof, and $R_2$ and $R_3$ are independently H or an alkyl moiety optionally with a hydroxyl group, ester group, ketone group, heterocyclic group, amino group, amide group, ether group, aldehyde group, carboxylic acid group, or a plurality thereof, in which the $R_1$, $R_2$ and $R_3$ moieties have a carbon atom bonded to the C(OH) group with the indicated functional group, if present, adjacent or spaced by a methylene —$CH_2$— moiety from the —C(OH)— moiety. Specific suitable multifunctional alcohols (with additional hydroxide or ether functionalities) include, for example, glycerol ($CH_2(OH)CH(OH)C(OH)H_2$), ethyl lactate ($CH_3CH_2OC(O)CH(OH)CH_3$), diacetone alcohol ($CH_3C(O)CH_2C(OH)(CH_3)_2$), ethylene glycol monomethyl ether ($CH_3OCH_2CH_2OH$), propylene glycol monomethyl ether ($CH_3OCH(CH_3)CH_2OH$), ethylene glycol, propylene glycol, diethylene glycol, polyethylene glycol, polyvinyl alcohol, or the like.

In general, nanoplate synthesis reaction is performed in water. The growth solution can have a silver salt concentration from about 0.00025 M to about 0.1M, in further embodiments from about 0.0005M to about 0.05M and in additional embodiments from about 0.001M to about 0.025M. The growth solution can comprise polycarboxylate anions from about 0.0003M to about 0.005M and in further embodiments from about 0.0006M to about 0.0035M. With respect to multifunctional alcohol, the growth solution can comprise from about 0.0002M to about 0.0025M and in further embodiments from about 0.00035M to about 0.002M. With respect to redox components, the growth solution can comprise from about 0.05M to about 1M hydrogen peroxide, from about 0.00005M to about 0.0002M reducing agent and in further embodiments from about 0.075M to about 0.8M hydrogen peroxide and from about 0.0001M to about 0.001M reducing agent. For the larger scale reaction, the molar ratio of hydrogen peroxide to reducing agent, especially for borohydride reducing agent, can be from about 10 about 120, in further embodiments from about 15 to about 100 and in additional embodiments from about 20 to about 80. A person of ordinary skill in the art will recognize that additional ranges of reactant concentrations within the explicit ranges above are contemplated and are within the present disclosure.

To perform the synthesis reaction, the reactants are added to water under good mixing conditions with a first portion of the peroxide added second to last with the reducing agent reserved. Once the other reactants are mixed, the reducing agent is quickly injected into the mixing growth solution. The reaction is then continued for an appropriate period of time to form the nanoplates. In the more concentrated scaled up synthesis, a second portion of the hydrogen peroxide is added gradually after the addition of the reducing agent. The ratio of the second quantity of hydrogen peroxide to the first quantity of hydrogen peroxide is at least about 0.5, in further embodiments at least about 0.75 and in additional embodiments from about 1 to about 10. The second quantity of peroxide is added over a period of time from about 1 minute to about 2 hours, in further embodiments from about 2 minutes to about 1.5 hr and in additional embodiments from about 3 minutes to about 1 hr. After completing the addition of the second quantity of the peroxide, the reaction is continued for at least two minutes, in further embodiments at least about 5 minutes and in additional embodiments from about 8 minutes to about 3 hours. A person of ordinary skill in the art will recognize that additional ranges of reaction times and reactant addition times within the above explicit ranges are contemplated and are within the present disclosure. The nanoplates can be harvested from the solution and can be re-suspended. But for the noble metal plating process, the nanoplates can be carried forward in the growth, i.e., synthesis, solution for coating, which saves an isolation step and also avoids loss of nanoplates during the harvesting, e.g., due to nanoplate instability.

The as synthesized silver nanoplates are formed without a polymer coating or other inorganic coating. The nanoplates can have an equivalent circular diameter, obtained by averaging the line segments extending through the mathematical center of the nanoplate from the edges, that is from about 20 nm to about 150 nm, in further embodiments from about 25 nm to about 120 nm and in additional embodiments from about 25 nm to about 90 nm. Also, the as synthesized silver nanoplates can have a peak absorption wavelength from about 450 nm to about 850 nm and in further embodiments from about 500 nm to about 750 nm. For some applications, it can be desirable to have a normalized absorption at 600 nm that is at least about 0.6, in further embodiments at least about 0.65 and in additional embodiments at least about 0.7. A person of ordinary skill in the art will recognize that additional property ranges within the explicit ranges above are contemplated and are within the present disclosure.

In some embodiments, a noble metal coating can be applied to the silver nanoplates. The silver nanoplates can be synthesized using the above process, or the silver nanoplates for coating can be synthesized using other techniques and may be obtained from commercial sources if desired. In any case, a gold coating can be applied uniformly using a relatively mild organic reducing agent. The coating process generally is performed with a polymer capping agent to facilitate the coating deposition. A ligand can be included in the reaction solution to mediate the coating process. It has been found that the inclusion of a polycarboxylate further facilitates the formation of coated nanoplates that have desirable optical properties. While the experiments herein are performed with citrate, it is expected that the polycarboxylate anions suitable for facilitating the nanoplate synthesis also are effective to provide desirable effects on the coating process, and suitable polycarboxylate anions include, for example, citrate, succinate, citramalate, malonate, tartrate, ioscitrate, cis-aconate, tricarballylate, mixtures thereof and other dicarboxylic acid and tricarboxylic acid with 1 or 2 carbon atoms separating the carboxylic acid functional groups.

For the coating reaction, a coating solution generally is gradually added to a reaction solution. The reaction solution comprises from about 0.00025 wt % to about 0.1 wt % silver nanoplates, in further embodiments from about 0.0005 wt % to about 0.05 wt % and in additional embodiments from about 0.001 wt % to about 0.025 wt % silver nanoplates. With respect to capping polymer, the reaction solution can comprise from about 0.005 wt % to about 5 wt %, in further embodiments from about 0.0075 wt % to about 3 wt % and in additional embodiments from about 0.01 wt % to about 2 wt %. Suitable capping polymers include, for example, PVP, polyvinyl alcohol, polyacrylic acid, combinations thereof or the like. The reaction solution can comprise from about 0.005M to about 2M polydentate ligand, in further embodiments from about 0.004M to about 1.5M and in additional embodiments from about 0.005M to about 1M. Generally, suitable ligands include, for example, nitrite, diethyl amine, ethylene diamine, nitrilotriacetic acid, iminobis(methylene phosphonic acid), aminotris(methylene phosphonic acid), ethylene diamine tetraacetic acid (EDTA), 1,3-propylenediaminetetraacetic acid (1,3-PDTA), triethylene tetramine, tri (2-aminoethyl) amine, diethylenetriaminepentaacetic acid, 1,2-cyclohexanediaminotetraacetic acid, iminodiacetic acid, methyliminodiacetic acid, N-(2-acetamide) iminoacetic acid, N-(2-carboxyethyl) iminodiacetic acid, N-(2-carboxymethyl)imino dipropionic acid, picolinic acid, dipicolinic acid, histidine, combinations thereof. With respect to reducing agent, the reaction solution can comprise from about 0.001M to about 0.1M reducing agent, in further embodiments from about 0.002M to about 0.08M and in additional embodiments from about 0.0025M to about 0.05M reducing agent. Also, the reaction solution can comprise from about 0.0005M to about 0.2M polycarboxylate, in further embodiments from about 0.00075M to about 0.05M, and in additional embodiments from about 0.001M to about 0.025M polycarboxylate anion. A person of ordinary skill in the art will recognize that additional ranges of composition of the reaction solution within the explicit ranges above are contemplated and are within the present disclosure.

The coating can be performed directly with the silver nanoplates in the solution used to synthesize the nanoplates without purification and, in some embodiments, without dilution. The precise composition of the solution with the product nanoplates may not be known although it can be reasonably surmised based on the compositions added for the synthesis. In any case, the silver nanoplate solution for performing the coating can be characterized based on the total silver concentration in any form, which can be determined based on the silver added to the reaction solution to form the silver nanoplates. In some embodiments, the solution can comprise at least about 0.00075 M, in further embodiments at least about 0.00085M, in additional embodiments at least about 0.001M and in other embodiments at least about 0.0011M silver in any form. A person of ordinary skill in the art will recognize that additional ranges of total silver concentrations within the explicit ranges above are contemplated and are within the present disclosure.

The coating solution can comprise complexed gold ions in concentrations from about 0.0002M to about 0.02M, in further embodiments from about 0.0003M to about 0.01M, and in additional embodiments from about 0.0004M to about 0.0075M. With respect to capping polymer, the coating solution can comprise from about 0.05 wt % to about 5 wt %, in further embodiments from about 0.075 wt % to about 3 wt % and in additional embodiments from about 0.1 wt % to about 2 wt %. The coating solution comprises a ligand to complex with the gold ion to lower the effective reduction potential of the Au salt. This is described by the Gao 2012 article cited above. Gao 2012 and the Examples below use iodide ions ($I^-$) as the selected ligands to lower the reduction potential. However, other ligands can also be effective in this role, including, for example, $Br^-$, sulfite, $CN^-$, $SCN^-$, thiosulfate ($S_2O_3^{-2}$), mixtures thereof, or the like. The molar ratio of ligands to gold ions or other noble metal ions can be greater than 1 and in further embodiments greater than 1.5. A person of ordinary skill in the art will recognize that additional ranges of coating solution compositions within the explicit ranges above are contemplated and are within the present disclosure. A person of ordinary skill in the art will recognize that additional composition ranges of the coating solution within the explicit ranges above are contemplated and are within the present disclosure.

For the coating process, the components of the reaction solution are initially well mixed. The coating solution is gradually added to the reaction solution. Generally, the coating solution is added over a period from about 2 minutes to about 5 hours, in further embodiments from about 5 minutes to about 4 hours and in additional embodiments from about 7 minutes to about 3 hours. The amount of time for the addition of the coating solution can be adjusted to some degree based on the amount of coating solution added, and the amount of coating solution added generally determined the amount of coating deposited. The coating solution is generally added at a rate appropriate to achieve the target times above, and can be added in reasonable increments to get good dilution spread over the time frame. The amount of gold coating deposited influences the chemical stability of the resulting coated nanoplates and the corresponding devices formed from the coated nanoplates. The amount of coating solution added and the concentration determines the amount of coating deposited. In some embodiments, the gold coated silver nanoplates comprise from about 2 atomic percent to about 45 atomic percent gold, and in further embodiments from about 5 atomic percent to about 40 atomic percent and in additional embodiments form about 7.5 atomic percent to about 35 atomic percent gold. A person of ordinary skill in the art will recognize that additional ranges of process time and coating levels within the explicit ranges above are contemplated and are within the present disclosure.

The absorption of visible light and adjacent portions of the electromagnetic spectrum by the silver nanoplates is characterized in terms of plasmon resonance. The gold coating can be deposited to not alter the basic features of the absorption spectrum but quantitative changes generally take place. The plasmon resonance of the nanoplates shifts the absorption spectrum toward the red portion of the spectrum. Gold coating has been observed to shift the spectrum back toward the blue end of the spectrum. However, it has been found that the use of the polycarboxylate anions during the coating process reduces the blue shift of the absorption upon coating such that a thicker coating can be applied without shifting the absorption spectrum to the blue more than desired.

The nanoplates can be characterized through their size and absorption spectrum. The diameter can be measured in the plane of the structures as an average line segment length through the center of the nanoplate. In general, the nanoplates can have an average diameter of no more than 200 nm, in further embodiments no more than about 170 nm, in additional embodiments from about 20 nm to about 150 nm and in other embodiments from about 25 nm to about 120 nm. The absorption spectrum can be characterized in several ways. The silver nanoplates of particular interest generally have an electromagnetic absorption peak in the visible portion of the spectrum with a wavelength from about 500 nm to about 725 nm, and in further embodiments from about 520 nm to about 700 nm. Referring values to a normalized absorption spectrum with the visible absorption peak set to 1, the relative absorption at 600 nm can be considered. In some embodiments, the normalized absorption at 600 nm can be at least about 0.6, in further embodiments at least about 0.65 and in additional embodiments at least about 0.7. A person of ordinary skill in the art will recognize that additional ranges of nanoplate size and absorption properties within the explicit ranges above are contemplated and are within the present disclosure.

As noted above, silver nanoplates can be unstable with respect to restructuring to other silver materials, such as nanoparticles. Using the synthesis approaches described herein relatively stable nanoplates can be formed. Without the noble metal coatings, the product nanoplates can be stable in dispersions without a polymer coating or a ceramic coating for periods of time in dark storage at room temperature and ambient atmosphere of at least about 2 weeks, in further embodiments at least about 3 weeks and in additional embodiments at least about 4 weeks or longer. The application of the noble metal coating greatly stabilizes the silver nanoplates relative to a range of conditions, including temperature changes, as demonstrated in the Examples.

Transparent Coatings and Films

Transparent coatings with silver nanoplate loaded polymers as described herein generally can be coated onto a transparent substrate for incorporation into a desired structure. General structures are described, and specific applications for transparent conductive films are found in following sections. In general, a precursor solution for the transparent filled coatings can be deposited using appropriate coating methods onto a transparent substrate to form a transparent structure. In some embodiments, the transparent substrate can be a film for incorporation into an ultimate device or alternatively or additionally an integral optical component, such as a light emitting device or a light receiving device. The discussion in this section focuses on a simple passive transparent substrate, and other structures are discussed in subsequent sections.

In general, any reasonable transparent substrate can be suitable. Thus, suitable substrates can be formed, for example, from inorganic glasses, such as silicate glasses, transparent polymer films, inorganic crystals or the like. In some embodiments, the substrate is a polymer film. Suitable polymers for a substrate include, for example, polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbornene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof or blend thereof or the like. Polymer films for some embodiments can have a thickness from about 5 microns to about 5 mm, in further embodiments, from about 10 microns to about 2 mm and in additional embodiment from about 15 microns to about 1 mm. A person of ordinary skill in the art will recognize that additional ranges of thicknesses within the explicit ranges above are contemplated and are within the present disclosure. Substrates can comprise a plurality of layers distinguished by composition and/or other properties. Some commercial transparent sheets can comprise a coating such as a hard abrasive resistant coating.

A transparent coating, e.g., with a silver nanoplate filler, generally can have a thickness of no more than about 100 microns, in further embodiments from about 15 nanometers (nm) to about 50 microns and in additional embodiments from about 50 nm to about 20 microns. Coating properties over a transparent conductive layer are described below. The transparent hue adjusted coatings can comprise from about 0.001 weight percent (wt %) to about 10 wt % silver nanoplates, in further embodiments from about 0.005 wt % to about 6 wt %, in other embodiments from about 0.01 wt % to about 5 wt %, and in additional embodiments from about 0.02 wt % to about 2.5 wt % silver nanoplates. The transparent coatings can further comprise polymer binder, optional property modifiers, such as crosslinking agents, wetting agents, viscosity modifiers, and/or stabilizers for transparent conductive films, and optionally a sparse metal conductive layer. A person of ordinary skill in the art will recognize that additional ranges of thickness and nanoplate concentrations in the loaded polymers within the explicit ranges above are contemplated and are within the present disclosure.

The nanoscale nature of the silver nanoplates can provide for good distribution throughout a polymer matrix such that a desirable degree of transparency can be maintained for a given color contribution. Generally, as used herein nanoscale refers to the average of at least one dimension of the particulates (dimensional cut-off) being no more than about 100 nm, in further embodiments no more than about 75 nm and in additional embodiments no more than about 50 nm. Thus, suitable nanoplates have an average thickness, being no more than the dimensional cut-off, and the other two average dimensions being at least a factor of ten greater than the average thickness, the other dimensions being roughly along the principle axes of the particles. Metal nanoplates can provide tuned color contributions based on size through hypothesized surface plasmon resonances, although Applicant does not wish to be limited by theory. Silver nanoplates can be obtained commercially with a polyvinylpyrrolidone coating or a silicon oxide (silica) coating. As an example below, data is presented with gold coated silver nanoparticles synthesized using the techniques described herein. Due to the inertness of gold and other noble metals, noble metal coated silver nanoplates can be stable with respect to corrosion and other environmental assaults.

The transparent loaded coatings can be formed by coating a precursor solution using appropriate coating methods.

Silver nanoplates can be incorporated into a suitable solvent selected to deposit the coating with appropriate compatibility. Suitable solvents generally include, for example, water, alcohols, ketones, esters, ethers, such as glycol ethers, aromatic compounds, alkanes, and the like and mixtures thereof. Specific solvents include, for example, water, ethanol, isopropyl alcohol, isobutyl alcohol, tertiary butyl alcohol, methyl ethyl ketone, glycol ethers, methyl isobutyl ketone, toluene, hexane, ethyl acetate, butyl acetate, ethyl lactate, PGMEA (2-methoxy-1-methylethylacetate), N,N-dimethyl formamide, N,N-dimethyl acetamide, acetonitrile, formic acid, dimethyl carbonate, or mixtures thereof.

In general, the polymer for the coating, generally a crosslinkable polymer, can be supplied as a commercial coating composition or formulated with selected polymer compositions, for addition of nanoscale colorants and/or other additives. Following usual convention, in the context of binders, the term polymer refers to oligomers, which can be derivatized to introduce additional functionalities. Crosslinking agents as well as other binder precursor components can be multifunctional, e.g., three or more functional groups, for forming highly crosslinked polymer products upon appropriate crosslinking conditions, which may be considered functionalized monomers or functionalized oligomers depending on the specific structure. Suitable polymers for the coatings can include, for example, radiation curable polymers and/or heat curable polymers. Suitable classes of radiation curable polymers and/or heat curable polymers include, for example, polysiloxanes, polysilsesquioxanes, polyurethanes, acrylic resins, acrylic copolymers, cellulose ethers and esters, nitrocellulose, other structural polysaccharides, polyethers, polyesters, polystyrene, polyimide, fluoropolymers, styrene-acrylate copolymers, styrene-butadiene copolymers, acrylonitrile butadiene styrene copolymers, polysulfides, epoxy containing polymers, copolymers thereof, and mixtures thereof. Suitable commercial coating compositions include, for example, coating solutions from POSS® Coatings from Hybrid Plastics, Inc. (Mississippi, USA), silica filled siloxane coatings from California Hardcoating Company (CA, USA), Dexerials Corporation (Japan), CrystalCoat UV-curable coatings from SDC Technologies, Inc. (CA, USA). Hardcoatings with some desirably properties are described in copending U.S. patent application Ser. No. 14/741,119 to Gu et al., now published U.S. patent application 2016/0369104, entitled "Transparent Polymer Hardcoat and Corresponding Transparent Films," incorporated herein by reference. In some embodiments, the crosslinkable binder precursor composition can comprise non-volatile relatively high molecular monomers in formulations with or without oligomers or lower molecular weight polymers in addition to the monomers. Collectively, non-volatile polymerizable compounds, which can be monomers, oligomers or lower molecular weight polymers, can be referred to as non-volatile polymer binder precursor compounds.

The polymer concentrations and correspondingly the concentrations of other non-volatile agents can be selected to achieve desired rheology of the coating solution, such as an appropriate viscosity for the selected coating process. Solvent can be added or removed to adjust total non-volatile concentrations, which distinguish the volatile solvents. Relative amounts of non-volatile can be selected to adjust the composition of the finished coating composition, and the total amounts of solids can be adjusted to achieve a desired thickness of the dried coating. Generally, the coating solution can have a concentration of non-volatile components from about 0.1 wt % to about 80 wt %, in further embodiments from about 0.5 wt % to about 60 wt % and in additional embodiments from about 0.75 wt % to about 55 wt %. A person of ordinary skill in the art will recognize that additional ranges of polymer concentrations within the specific ranges above are contemplated and are within the present disclosure.

Silver nanoplates can be incorporated into the coating solution for forming a coating layer. A coating precursor solution can comprise from about 0.0001 wt % to about 2 wt % silver nanoplates, in further embodiments from about 0.00025 wt % to about 0.2 wt % and in additional embodiments from about 0.0005 wt % to about 0.02 wt % silver nanoplates. A person of ordinary skill in the art will recognize that additional ranges of silver nanoplates in a coating solution within the explicit ranges above are contemplated and are within the present disclosure. Additional additives, such as crosslinking agents, wetting agents, viscosity modifiers, dispersing aids, stabilizers, and the like can be added as desired, and suitable compositions are described below.

The transparent coating with polymer nanoplates in some embodiments can cause a decrease of the total transmittance of visible light relative to a corresponding coating without the silver nanoplates by no more than about 5 percentage points, in further embodiments no more than about 3 and in additional embodiments no more than about 1.5 percentage points. Also, the transparent coating with silver nanoplates can cause an increase of the haze in some embodiments relative to corresponding unloaded coatings by no more than about 1.5 percentage points, in further embodiments by no more than about 1, and in additional embodiments by no more than about 0.6 percentage points. A person of ordinary skill in the art will recognize that additional ranges of modifications of optical properties due to loaded polymer coatings within the explicit ranges above are contemplated and are within the present disclosure. The corresponding unloaded coatings have the same concentrations in the solvent of components other than the absent silver nanoplates and is processed the same way so that the final thickness of the coating may be slightly different for the corresponding coating.

For the deposition of the coating precursor solutions, any reasonable deposition approach can be used, such as dip coating, spray coating, knife edge coating, bar coating, Meyer-rod coating, slot-die coating, gravure printing, inkjet printing, screen printing, spin coating or the like. The deposition approach directs the amount of liquid deposited, and the concentration of the solution can be adjusted to provide the desired thickness of product coating on the surface. After forming the coating with the dispersion, the coating can be dried to remove the liquid and crosslinked appropriately.

Transparent Conductive Films

The transparent electrically conductive structures or films generally can comprise a sparse metal conductive layer that provides the electrical conductivity without significantly adversely altering the optical properties and various additional layers that provide mechanical support as well as protection of the conductive element. A polymer overcoat can be placed over the sparse metal conductive layer. The nanoscale colorants as described herein can be placed in an overcoat layer, an undercoat layer and/or directly into the sparse metal conductive layer. In additional embodiments, an electrically conductive layer can comprise conductive metal oxides as a film or as particulates. The nanoscale colorants can be selected to lower the b* value of the transparent film, which generally improves the whiteness observed, or to provide a desired hue to the film.

Transparent electrically conductive elements, e.g., films, can comprise a sparse metal conductive layer in some embodiments. The conductive layers are generally sparse to provide desired amount of optical transparency, so the coverage of the metal has very significant gaps within the layer of the conductive element. For example, transparent electrically conductive films can comprise metal nanowires deposited along a layer where sufficient contact can be provided for electron percolation to provide suitable conduction pathways. In other embodiments, the transparent electrically conductive film can comprise a fused metal nanostructured network, which has been found to exhibit desirable electrical and optical properties. In general, the nanowires can be formed from a range of metals, such as silver, gold, indium, tin, iron, cobalt, platinum, palladium, nickel, cobalt, titanium, copper and alloys thereof, which can be desirable due to high electrical conductivity. Commercial metal nanowires are available from Sigma-Aldrich (Missouri, USA), Cangzhou Nano-Channel Material Co., Ltd. (China), Blue Nano (North Carolina, U.S.A.), EMFUTUR (Spain), Seashell Technologies (California, U.S.A.), C3Nano-Aiden (Korea), nanoComposix (U.S.A.), Nanopyxis (Korea), K&B (Korea), ACS Materials (China), KeChuang Advanced Materials (China), and Nanotrons (USA). Alternatively, silver nanowires can also be synthesized using a variety of known synthesis routes or variations thereof.

For appropriate embodiments, a sparse metal conductive layer can be formed on a substrate that can have one or more layers in the structure of the substrate. The substrate generally can be identified as a self supporting film or sheet structure. A thin solution processed layer, referred to as an undercoat, can be optionally placed along the top surface of the substrate film and immediately under the sparse metal conductive layer. Also, the sparse metal conductive can be coated with one or more additional layers that provide some protection on the side of the sparse metal conductive layer opposite the substrate. In general, the electrically conductive structure can be placed in either orientation in the final product, i.e., with the substrate facing outward or with the substrate against the surface of the product supporting the electrically conductive structure. In some embodiments, a plurality of coatings, e.g., undercoats and/or overcoats, can be applied, and each layer may or may not have selected nanoscale colorants.

Referring to FIG. 1, representative transparent conductive film 100 comprises a substrate 102, undercoat layer 104, sparse metal conductive layer 106, overcoat layer 108, optically clear adhesive layer 110 and protective surface layer 112, although not all embodiments include all layers. A transparent conductive film generally comprises a sparse metal conductive layer and at least one layer on each side of the sparse metal conductive layer. The total thickness of the transparent conductive film can generally have a thickness from 10 microns to about 3 millimeters (mm), in further embodiments from about 15 microns to about 2.5 mm and in other embodiments from about 25 microns to about 1.5 mm. A person of ordinary skill in the art will recognize that additional ranges of thicknesses within the explicit ranges above are contemplated and are within the present disclosure. In some embodiments, the length and width of the film as produced can be selected to be appropriate for a specific application so that the film can be directly introduced for further processing into a product. In additional or alternative embodiments, a width of the film can be selected for a specific application, while the length of the film can be long with the expectation that the film can be cut to a desired length for use. For example, the film can be in long sheets or a roll. Similarly, in some embodiments, the film can be on a roll or in another large standard format and elements of the film can be cut according to a desired length and width for use.

Substrate 102 generally comprises a durable support layer formed from an appropriate polymer or polymers. In some embodiments, the substrate can has a thickness from about 10 microns to about 1.5 mm, in further embodiments from about 15 microns to about 1.25 mm and in additional embodiments from about 25 microns to about 1 mm. A person of ordinary skill in the art will recognize that additional ranges of thicknesses of the substrate within the explicit ranges above are contemplated and are within the present disclosure. Suitable optically clear polymers with very good transparency, low haze and good protective abilities can be used for the substrate. Suitable polymers include, for example, polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbornene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof or blend thereof or the like. Suitable commercial polycarbonate substrates include, for example, MAKROFOL SR243 1-1 CG, commercially available from Bayer Material Science; TAP® Plastic, commercially available from TAP Plastics; and LEXAN™ 8010 CDE, commercially available from SABIC Innovative Plastics. Protective surface layer 112 can independently have a thickness and composition covering the same thickness ranges and composition ranges as the substrate as described in this paragraph above.

Optional undercoat 104 and/or optional overcoat 108, independently selectable for inclusion, can be placed respectively under or over sparse metal conductive layer 106. Optional coatings 104, 108 can comprise a curable polymer, e.g., heat curable or radiation curable polymers. Suitable polymers for coatings 104, 108 are described below as binders for inclusion in the metal nanowire inks, and the list of polymers, corresponding cross linking agents and additives apply equally to optional coatings 104, 108 without repeating the discussion explicitly here. Coatings 104, 108 can have a thickness from about 25 nm to about 2 microns, in further embodiments from about 40 nm to about 1.5 microns and in additional embodiments from about 50 nm to about 1 micron. A person of ordinary skill in the art will recognize that additional ranges of overcoat thickness within the explicit ranges above are contemplated and are within the present disclosure. In general, the thinness of overcoat 108 allows for electrical conduction through overcoat 108 so that electrical connection can be made to sparse metal conductive layer 106, although in some embodiments, an overcoat can comprise sublayers in which electrical conductivity is provided through some but not necessarily all of the sublayers.

Optional optically clear adhesive layer 110 can have a thickness from about 10 microns to about 300 microns, in further embodiments from about 15 microns to about 250 microns and in other embodiments from about 20 microns to about 200 microns. A person of ordinary skill in the art will recognize that additional ranges of thicknesses of optically clear adhesive layers within the explicit ranges above are contemplated and are within the present disclosure. Suitable optically clear adhesives can be contact adhesives. Optically clear adhesives include, for example, coatable compositions and adhesive tapes. UV curable liquid optically clear adhesives are available based on acrylic or polysiloxane chemistries. Suitable adhesive tapes are available commercially, for example, from Lintec Corporation (MO series); Saint Gobain Performance Plastics (DF713 series); Nitto Americas (Nitto Denko) (LUCIACS CS9621T and LUCIAS CS9622T); DIC Corporation (DAITAC LT series OCA, DAITAC WS series OCA and DAITAC ZB series); PANAC Plastic Film Company (PANACLEAN series); Minnesota Mining and Manufacturing (3M, Minnesota U.S.A.—product numbers 8146, 8171, 8172, 8173 and similar products) and Adhesive Research (for example product 8932).

The amount of nanowires delivered onto the substrate for sparse metal conductive layer 106 can involve a balance of factors to achieve desired amounts of transparency and electrical conductivity. While thickness of the nanowire network can in principle be evaluated using scanning electron microscopy, the network can be relatively sparse to provide for optical transparency, which can complicate the measurement. In general, the sparse metal conductive structure, e.g., fused metal nanowire network, would have an average thickness of no more than about 5 microns, in further embodiments no more than about 2 microns and in other embodiments from about 10 nm to about 500 nm. However, the sparse metal conductive structures are generally relatively open structures with significant surface texture on a submicron scale. The loading levels of the nanowires can provide a useful parameter of the network that can be readily evaluated, and the loading value provides an alternative parameter related to thickness. Thus, as used herein, loading levels of nanowires onto the substrate is generally presented as milligrams of nanowires for a square meter of substrate. In general, the metal conductive networks, whether or not fused, can have a loading from about 0.1 milligrams (mg)/m$^2$ to about 300 mg/m$^2$, in further embodiments from about 0.5 mg/m$^2$ to about 200 mg/m$^2$, and in other embodiments from about 1 mg/m$^2$ to about 150 mg/m$^2$. The transparent conductive layer can comprise from about 0.05 wt % to about 70 wt % metal, in other embodiments from about 0.075 wt % to about 60 wt % and in further embodiments from about 0.1 wt % to about 50 wt % metal in a conductive network. A person of ordinary skill in the art will recognize that additional ranges of thickness, metal loading and concentrations within the explicit ranges above are contemplated and are within the present disclosure. If the sparse metal conductive layer is patterned, the thickness and loading discussion applies only to the regions where metal is not excluded or significantly diminished by the patterning process. The sparse metal conductive layer can comprise silver nanoplates in addition to a polymer binder and other processing aids and the like. Ranges of concentration of silver nanoplates described above for loadings in transparent polymer layers generally also apply to sparse metal conductive layers. Expressed another way, the weight ratio of metal nanowires used to form a sparse metal conductive element to silver nanoplates can be from about 250:1 to about 5:1 and in further embodiments from about 100:1 to about 10:1. It is possible that in relevant embodiments silver nanoplates incorporated into the sparse metal conductive layer may or may not fuse or partially fuse into the fused metal nanostructured network, although unless explicitly stated references to silver nanoplates in a layer with a fused metal nanostructured network refer generally to the structure whether or not the silver nanoplates fuse into the network. No significant changes in electrical conductivity or color expectations are observed with the introduction of metal nanoplates in the sparse metal conductive layer. Correspondingly, references to silver nanoplates as nanoscale colorants do not refer to metal nanowires incorporated into the fused metal nanostructured network.

Generally, within the total thicknesses above for particular components of film 100, layers 102, 104, 106, 108, 110, 112 can be subdivided into sublayers, for example, with different compositions from other sublayers. For example, an overcoat layer can comprise sublayers with different property enhancing components. Thus, more complex layer stacks can be formed. Sublayers may or may not be processed similarly to other sublayers within a particular layer, for example, one sublayer can be laminated while another sublayer can be coated and cured. For example, a coating can be supplied with a nanoscale colorant and a further layer over this layer can be supplied with a property enhancing nanoparticles, such as a nanodiamond to provide protective hardness. Polymer coatings with property enhancing nanoparticles, such as nanodiamonds, are described in copending U.S. patent application Ser. No. 14/577,669 to Virkar et al., now published U.S. patent application 2016/0096967, entitled "Property Enhancing Fillers for Transparent Coatings and Transparent Conductive films," incorporated herein by reference.

For some applications, it is desirable to pattern the electrically conductive portions of the film to introduce desired functionality, such as distinct regions of a touch sensor. Patterning can be performed by changing the metal loading on the substrate surface either by printing metal nanowires at selected locations with other locations being effectively barren of metal or to etch or otherwise ablate metal from selected locations either before and/or after fusing the nanowires if the nanowires are fused in the particular embodiment. For appropriate embodiments, it has been discovered that high contrast in electrical conductivity can be achieved between fused and unfused portions of a layer with essentially equivalent metal loading so that patterning can be performed by selectively fusing the metal nanowires. This ability to pattern based on fusing provides significant additional patterning options based on selective fusing of the nanowires, for example, through the selective delivery of a fusing solution or vapor. Patterning based on selective fusing of metal nanowires is described in the '833 application and the '669 application above.

Figure 2:
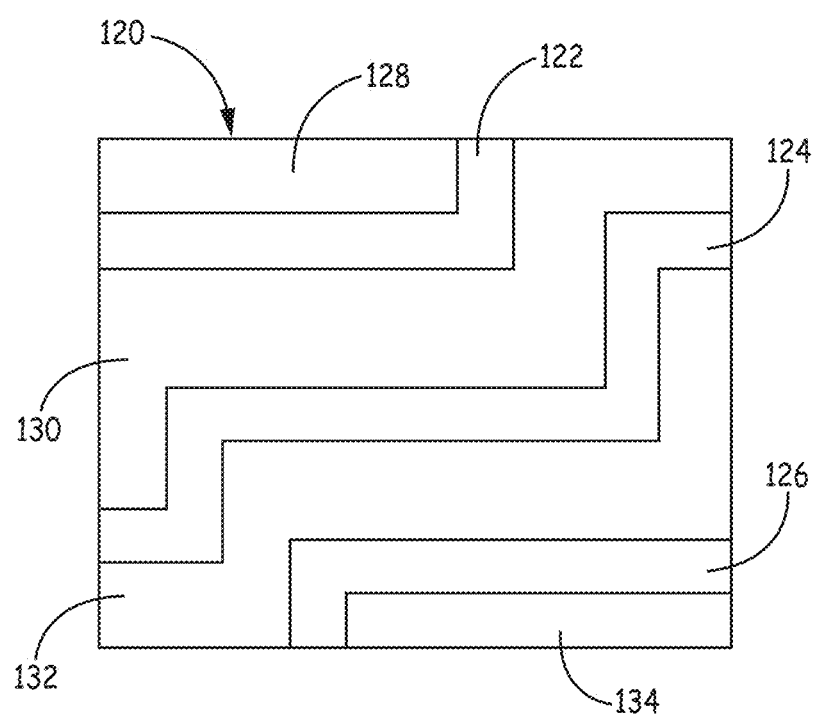
FIG. 2 is a top view of a representative schematic patterned structure with three electrically conductive pathways formed with sparse metal conductive layers.

As a schematic example, a fused metal nanostructured network can form conductive patterns along a substrate surface 120 with a plurality of electrically conductive pathways 122, 124, and 126 surrounded by electrically resistive regions 128, 130, 132, 134, as shown in FIG. 2. As shown in FIG. 2, the fused area correspond with three distinct electrically conductive regions corresponding with electrically conductive pathways 122, 124, and 126. Although three independently connected conductive regions have been illustrated in FIG. 2, it is understood that patterns with two, four or more than 4 conductive independent conductive pathways or regions can be formed as desired. For many commercial applications, fairly intricate patterns can be formed with a large number of elements. In particular, with available patterning technology adapted for the patterning of the films described herein, very fine patterns can be formed with highly resolved features. Similarly, the shapes of the particular conductive regions can be selected as desired.

The transparent conductive film is generally built up around the sparse metal conductive element which is deposited to form the functional feature of the film. Various layers are coated, laminated or otherwise added to the structure using appropriate film processing approaches. The deposit of the sparse metal conductive layer is described further below in the context of a fused metal nanostructured layers, but un-fused metal nanowire coatings can be similarly deposited except that the fusing components are absent.

The sparse metal conductive layer generally is solution coated onto a substrate, which may or may not have a coating layer on top of the substrate which then forms an undercoat adjacent the sparse metal conductive layer. An overcoat can be solution coated onto the sparse metal conductive layer in some embodiments. Crosslinking, with application of UV light, heat or other radiation, can be performed to crosslink polymer binders in the coating layers and/or the sparse metal conductive layer, which can be performed in one step or multiple steps.

Sparse Metal Conductive Layers

Sparse metal conductive layers are generally formed from metal nanowires. With sufficient loading and selected nanowire properties, reasonable electrical conductivity can be achieved with the nanowires with corresponding appropriate optical properties. It is expected that the stabilized film structures described herein can yield desirable performance for films with various sparse metal conductive structures. However, particularly desirable properties have been achieved with fused metal nanostructured networks.

As summarized above, several practical approaches have been developed to accomplish the metal nanowire fusing. The metal loading can be balanced to achieve desirable levels of electrical conductivity with good optical properties. In general, the metal nanowire processing can be accomplished through deposition of two inks with the first ink comprising the metal nanowires and the second ink comprising a fusing composition, or through the deposition of an ink that combines the fusing elements into the metal nanowire dispersion. The inks may or may not further comprise additional processing aids, binders or the like. Suitable patterning approaches can be selected to be suitable for the particular ink system.

In general, one or more solutions or inks for the formation of the metal nanostructured network can collectively comprise well dispersed metal nanowires, a fusing agent, and optional additional components, for example, a polymer binder, a crosslinking agent, a wetting agent, e.g., a surfactant, a thickener, a dispersant, other optional additives or combinations thereof. The solvent for the metal nanowire ink and/or the fusing solution if distinct from the nanowire ink can comprise an aqueous solvent, an organic solvent or mixtures thereof. In particular, suitable solvents include, for example, water, alcohols, ketones, esters, ethers, such as glycol ethers, aromatic compounds, alkanes, and the like and mixtures thereof. Specific solvents include, for example, water, ethanol, isopropyl alcohol, isobutyl alcohol, tertiary butyl alcohol, methyl ethyl ketone, glycol ethers, methyl isobutyl ketone, toluene, hexane, ethyl acetate, butyl acetate, ethyl lactate, PGMEA (2-methoxy-1-methylethylacetate), dimethyl carbonate, or mixtures thereof. While the solvent should be selected based on the ability to form a good dispersion of metal nanowires, the solvents should also be compatible with the other selected additives so that the additives are soluble in the solvent. For embodiments in which the fusing agent is included in a single solution with the metal nanowires, the solvent or a component thereof may or may not be a significant component of the fusing solution, such as alcohols and can be selected accordingly if desired.

The metal nanowire ink, in either a one ink or two ink configuration, can include from about 0.01 to about 1 weight percent metal nanowires, in further embodiments from about 0.02 to about 0.75 weight percent metal nanowires and in additional embodiments from about 0.04 to about 0.5 weight percent metal nanowires. A person of ordinary skill in the art will recognize that additional ranges of metal nanowire concentrations within the explicit ranges above are contemplated and are within the present disclosure. The concentration of metal nanowires influences the loading of metal on the substrate surface as well as the physical properties of the ink.

In general, the nanowires can be formed from a range of metals, such as silver, gold, indium, tin, iron, cobalt, platinum, palladium, nickel, cobalt, titanium, copper and alloys thereof, which can be desirable due to high electrical conductivity. Commercial metal nanowires are available from Sigma-Aldrich (Missouri, USA), Cangzhou Nano-Channel Material Co., Ltd. (China), Blue Nano (North Carolina, U.S.A.), EMFUTUR (Spain), Seashell Technologies (California, U.S.A.), Aiden (Korea), nanoComposix (U.S.A.), Nanopyxis (Korea), K&B (Korea), ACS Materials (China), KeChuang Advanced Materials (China), and Nanotrons (USA). Silver in particular provides excellent electrical conductivity, and commercial silver nanowires are available. Alternatively, silver nanowires can also be synthesized using a variety of known synthesis routes or variations thereof. To have good transparency and low haze, it is desirable for the nanowires to have a range of small diameters. In particular, it is desirable for the metal nanowires to have an average diameter of no more than about 250 nm, in further embodiments no more than about 150 nm, and in other embodiments from about 10 nm to about 120 nm. With respect to average length, nanowires with a longer length are expected to provide better electrical conductivity within a network. In general, the metal nanowires can have an average length of at least a micron, in further embodiments, at least 2.5 microns and in other embodiments from about 5 microns to about 100 microns, although improved synthesis techniques developed in the future may make longer nanowires possible. An aspect ratio can be specified as the ratio of the average length divided by the average diameter, and in some embodiments, the nanowires can have an aspect ratio of at least about 25, in further embodiments from about 50 to about 10,000 and in additional embodiments from about 100 to about 2000. A person of ordinary skill in the art will recognize that additional ranges of nanowire dimensions within the explicit ranges above are contemplated and are within the present disclosure.

Polymer binders and the solvents are generally selected consistently such that the polymer binder is soluble or dispersible in the solvent. In appropriate embodiments, the metal nanowire ink generally comprises from about 0.02 to about 5 weight percent binder, in further embodiments from about 0.05 to about 4 weight percent binder and in additional embodiments from about 0.1 to about 2.5 weight percent polymer binder. In some embodiments, the polymer binder comprises a crosslinkable organic polymer, such as a radiation crosslinkable organic polymer and/or a heat curable organic binder. To facilitate the crosslinking of the binder, the metal nanowire ink can comprise in some embodiments from about 0.0005 wt % to about 1 wt % of a crosslinking agent, in further embodiments from about 0.002 wt % to about 0.5 wt % and in additional embodiments from about 0.005 wt % to about 0.25 wt %. The nanowire ink can optionally comprise a rheology modifying agent or combinations thereof. In some embodiments, the ink can comprise a wetting agent or surfactant to lower the surface tension, and a wetting agent can be useful to improve coating properties. The wetting agent generally is soluble in the solvent. In some embodiments, the nanowire ink can comprise from about 0.01 weight percent to about 1 weight percent wetting agent, in further embodiments from about 0.02 to about 0.75 weight percent and in other embodiments from about 0.03 to about 0.6 weight percent wetting agent. A thickener can be used optionally as a rheology modifying agent to stabilize the dispersion and reduce or eliminate settling. In some embodiments, the nanowire ink can comprise optionally from about 0.05 to about 5 weight percent thickener, in further embodiments from about 0.075 to about 4 weight percent and in other embodiments from about 0.1 to about 3 weight percent thickener. A person of ordinary skill in the art will recognize that additional ranges of binder, wetting agent and thickening agent concentrations within the explicit ranges above are contemplated and are within the present disclosure.

A range of polymer binders can be suitable for dissolving/dispersing in a solvent for the metal nanowires, and suitable binders include polymers that have been developed for coating applications. Hard coat polymers, e.g., radiation curable coatings, are commercially available, for example as hard coat materials for a range of applications, that can be selected for dissolving in aqueous or non-aqueous solvents. Suitable classes of radiation curable polymers and/or heat curable polymers include, for example, polyurethanes, acrylic resins, acrylic copolymers, cellulose ethers and esters, other water insoluble structural polysaccharides, polyethers, polyesters, epoxy containing polymers, and mixtures thereof. Examples of commercial polymer binders include, for example, NEOCRYL® brand acrylic resin (DMS NeoResins), JONCRYL® brand acrylic copolymers (BASF Resins), ELVACITE® brand acrylic resin (Lucite International), SANCURE® brand urethanes (Lubrizol Advanced Materials), cellulose acetate butyrate polymers (CAB brands from Eastman™ Chemical), BAYHYDROL™ brand polyurethane dispersions (Bayer Material Science), UCECOAT® brand polyurethane dispersions (Cytec Industries, Inc.), MOWITOL® brand polyvinyl butyral (Kuraray America, Inc.), cellulose ethers, e.g., ethyl cellulose or hydroxypropyl methyl cellulose, other polysaccharide based polymers such as Chitosan and pectin, synthetic polymers like polyvinyl acetate, and the like. The polymer binders can be self-crosslinking upon exposure to radiation, and/or they can be crosslinked with a photoinitiator or other crosslinking agent. In some embodiments, photocrosslinkers may form radicals upon exposure to radiation, and the radicals then induce crosslinking reactions based on radical polymerization mechanisms. Suitable photoinitiators include, for example, commercially available products, such as IRGACURE® brand (BASF), GENOCURE™ brand (Rahn USA Corp.), and DOUBLECURE® brand (Double Bond Chemical Ind., Co, Ltd.), combinations thereof or the like.

Wetting agents can be used to improve the coatability of the metal nanowire inks as well as the quality of the metal nanowire dispersion. In particular, the wetting agents can lower the surface energy of the ink so that the ink spreads well onto a surface following coating. Wetting agents can be surfactants and/or dispersants. Surfactants are a class of materials that function to lower surface energy, and surfactants can improve solubility of materials. Surfactants generally have a hydrophilic portion of the molecule and a hydrophobic portion of the molecule that contributes to its properties. A wide range of surfactants, such as nonionic surfactants, cationic surfactant, anionic surfactants, zwitterionic surfactants, are commercially available. In some embodiments, if properties associated with surfactants are not an issue, non-surfactant wetting agents, e.g., dispersants, are also known in the art and can be effective to improve the wetting ability of the inks. Suitable commercial wetting agents include, for example, COATOSIL™ brand epoxy functionalized silane oligomers (Momentum Performance Materials), SILWET™ brand organosilicone surfactant (Momentum Performance Materials), THETAWET™ brand short chain non-ionic fluorosurfactants (ICT Industries, Inc.), ZETASPERSE® brand polymeric dispersants (Air Products Inc.), SOLSPERSE® brand polymeric dispersants (Lubrizol), XOANONS WE-D545 surfactant (Anhui Xoanons Chemical Co., Ltd), EFKA™ PU 4009 polymeric dispersant (BASF), MASURF FP-815 CP, MASURF FS-910 (Mason Chemicals), NOVEC™ FC-4430 fluorinated surfactant (3M), mixtures thereof, and the like.

Thickeners can be used to improve the stability of the dispersion by reducing or eliminating settling of the solids from the metal nanowire inks. Thickeners may or may not significantly change the viscosity or other fluid properties of the ink. Suitable thickeners are commercially available and include, for example, CRAYVALLAC™ brand of modified urea such as LA-100 (Cray Valley Acrylics, USA), polyacrylamide, THIXOL™ 53 L brand acrylic thickener, COAPUR™ 2025, COAPUR™ 830 W, COAPUR™ 6050, COAPUR™ XS71 (Coatex, Inc.), BYK® brand of modified urea (BYK Additives), Acrysol DR 73, Acrysol RM-995, Acrysol RM-8W (Dow Coating Materials), Aquaflow NHS-300, Aquaflow XLS-530 hydrophobically modified polyether thickeners (Ashland Inc.), Borchi Gel L 75 N, Borchi Gel PW25 (OMG Borchers), and the like.

As noted above, the inks for depositing the sparse metal conductive layers can further comprise silver nanoplates. The solution to form the sparse metal conductive layer can comprise from about 0.0001 wt % to about 2.5 wt % silver nanoplates, in further embodiments from about 0.0002 wt % to about 2 wt % and in additional embodiments from about 0.0005 to about 1.5 wt % silver nanoplates. A person of ordinary skill in the art will recognize that additional ranges of silver nanoplate concentrations within the explicit ranges above are contemplated and are within the present disclosure.

Additional additives can be added to the metal nanowire ink, generally each in an amount of no more than about 5 weight percent, in further embodiments no more than about 2 weight percent and in further embodiments no more than about 1 weight percent. Other additives can include, for example, anti-oxidants, UV stabilizers, defoamers or anti-foaming agents, anti-settling agents, viscosity modifying agents, or the like.

As noted above, fusing of the metal nanowires can be accomplished through various agents. Without wanting to be limited by theory, the fusing agents are believed to mobilize metal ions, and the free energy seems to be lowered in the fusing process. Excessive metal migration or growth may lead in some embodiments to a degeneration of the optical properties, so desirable results can be achieved through a shift in equilibrium in a reasonably controlled way, generally for a short period of time, to generate sufficient fusing to obtain desired electrical conductivity while maintaining desired optical properties. In some embodiments, initiation of the fusing process can be controlled through a partial drying of the solutions to increase concentrations of the components, and quenching of the fusing process can be accomplished, for example, through rinsing or more completing drying of the metal layer. The fusing agent can be incorporated into a single ink along with the metal nanowires. The one ink solution can provide appropriate control of the fusing process.

In some embodiments, a process is used in which a sparse nanowire film is initially deposited and subsequent processing with or without depositing another ink provides for the fusing of the metal nanowires into a metal nanostructured network, which is electrically conducting. The fusing process can be performed with controlled exposure to a fusing vapor and/or through the deposition of a fusing agent in solution. Sparse metal conductive layers are generally formed on a selected substrate surface. The as-deposited nanowire film generally is dried to remove the solvent. Processing can be adapted for patterning of the film.

For the deposition of the metal nanowire ink, any reasonable deposition approach can be used, such as dip coating, spray coating, knife edge coating, bar coating, Meyer-rod coating, slot-die coating, gravure printing, spin coating or the like. The ink can have properties, such as viscosity, adjusted appropriately with additives for the desired deposition approach. Similarly, the deposition approach directs the amount of liquid deposited, and the concentration of the ink can be adjusted to provide the desired loading of metal nanowires on the surface. After forming the coating with the dispersion, the sparse metal conductive layer can be dried to remove the liquid.

The films can be dried, for example, with a heat gun, an oven, a thermal lamp or the like, although the films that can be air dried can be desired in some embodiments. In some embodiments, the films can be heated to temperatures from about 50° C. to about 150° C. during drying. After drying, the films can be washed one or more times, for example, with an alcohol or other solvent or solvent blend, such as ethanol or isopropyl alcohol, to remove excess solids to lower haze. Patterning can be achieved in several convenient ways. For example, printing of the metal nanowires can directly result in patterning. Additionally or alternatively, lithographic techniques and/or ablation methods can be used to remove portions of the metal nanowires, prior to or after fusing, to form a pattern. One or more overcoat layers can be applied over the sparse metal conductive layer, as described above.

Optically clear adhesive layers and thicker protective films covering the sparse metal conductive layer can be formed with holes or the like in appropriate locations to provide for electrical connections to the conductive layer. In general, various polymer film processing techniques and equipment can be used to the processing of these polymer sheets, and such equipment and techniques are well developed in the art, and future developed processing techniques and equipment can be correspondingly adapted for the materials herein.

Properties of Hue Adjusted Films

The silver nanoplates are generally selected to provide desired color adjustment of the transparent film without reducing the total transparency more than an acceptable amount. An acceptable amount of transparency reduction may be application specific. In some embodiments, it is further desirable for films with the silver nanoplates to have a continued low haze. In particular, silver nanoplates have been found to provide good color adjustment with low contributions to haze. In general, the transparent films further comprise a transparent conductive layer, such as a sparse metal conductive layer.

In the context of sparse metal conductive layers, the silver nanoplates may be selected to lower the overall value of $b^*$ in the CIE color scale. Highly conductive sparse metal conductive layers can be found to have a yellowish tint, and the lowering of $b^*$ can result in a whiter appearance of the film. As demonstrated in the Examples, several specific silver nanoplates have been found to successfully lower the $b^*$ value of the films. Additionally or alternatively, a selected color or color pattern can be introduced through the incorporation of selected silver nanoplates. For example, a pattern of colored panels can be introduced.

In some embodiments, the silver nanoplates can result in a decrease in $b^*$ of at least about 0.2, in further embodiments at least about 0.25, and in additional embodiments at least about 0.3 relative to corresponding films without the silver nanoplates. Also, it can be desirable for the absolute value of $b^*$ for the transparent film to be no more than 1.2, in further embodiments no more than 1.1 and in additional embodiments no more than a value of 1.0. For embodiments with desired more white transmission, the absolute value of $a^*$ in the films with the silver nanoplates can be no more than about 1, in additional embodiment no more than about 0.65, in other embodiments no more than about 0.6, and in further embodiments no more than about 0.5. A person of ordinary skill in the art will recognize that additional ranges of optical parameters within the explicit ranges above are contemplated and are within the present disclosure. Values of $b^*$ and $a^*$ can be evaluated using the equations in the standard CIE DE2000, Center International Commission on Illumination (Commission Internationale de L'Eclairage), see Colorimetry, 3rd Edition, CIE, 2004, incorporated herein by reference. These calculations can be performed using commercial spectrophotometers and software, such as Konica Minolta Spectrophotometer CM-3700A with Spectra-Magic™ NX software.

The general electrical and optical properties of the transparent conductive films are presented in the following section, and the ranges of effect of the silver nanoplates on these properties is discussed in the following. For incorporation into transparent coatings for transparent conductive films or directly into the ink for the formation of a sparse metal conductive layer, the loaded overcoats generally do not increase the sheet resistance of the sparse metal conductive layer with the thin overcoat significantly relative to an equivalent film without the silver nanoplates, and in some embodiments the sheet resistance increases by no more than about 20%, in further embodiments, no more than about 15% and in additional embodiments, no more than about 10% relative to the sheet resistance of a corresponding film without the silver nanoplates. While achieving the desired decrease of $b^*$, the silver nanoplates can decrease total transmission relative to incident visible light in units of percent transmission in some embodiments by less than about 3 and in further embodiments by less than about 2, and in some embodiments by no more than about 1.5 relative to corresponding films without the silver nanoplates. Also, it can be desirable for the haze to not increase a large amount with the silver nanoplates in the film. In some embodiments, the haze can increase in measured values of haze in units of percent by no more than about 0.5, in further embodiments by no more than about 0.4, in additional embodiments no more than about 0.3, in other embodiments by no more than about 0.25, in some embodiments by no more than about 0.2 and in additional embodiments no more than about 0.15 relative to a corresponding film without the silver nanoplates. In some embodiments with silver nanoplates, the haze is actually observed to decrease, so silver nanoplates at an appropriate concentration can be used to reduce haze in addition to improving the whiteness of transmitted light, although nanoscale pigments tested to date significantly increase the haze. A person of ordinary skill in the art will recognize that additional ranges of sheet resistance increase, total transmittance change and haze change within the explicit ranges above are contemplated and are within the present disclosure.

Transparent Conductive Films—Electrical and Optical Properties

The sparse metal conductive layers, e.g., fused metal nanostructured networks, can provide low electrical resistance while providing good optical properties. Thus, the films can be useful as transparent conductive electrodes or the like. The transparent conductive electrodes can be suitable for a range of applications such as electrodes along light receiving surfaces of solar cells. For displays and in particular for touch screens, the films can be patterned to provide electrically conductive patterns formed by the film. The substrate with the patterned film, generally has good optical properties at the respective portions of the pattern.

Electrical resistance of thin films can be expressed as a sheet resistance, which is reported in units of ohms per square (Ω/□ or ohms/sq) to distinguish the values from bulk electrical resistance values according to parameters related to the measurement process. Sheet resistance of films is generally measured using a four point probe measurement or another suitable process. In some embodiments, the fused metal nanowire networks can have a sheet resistance of no more than about 300 ohms/sq, in further embodiments no more than about 200 ohms/sq, in additional embodiments no more than about 100 ohms/sq and in other embodiments no more than about 60 ohms/sq. A person of ordinary skill in the art will recognize that additional ranges of sheet resistance within the explicit ranges above are contemplated and are within the present disclosure. Depending on the particular application, commercial specifications for sheet resistances for use in a device may not be necessarily directed to lower values of sheet resistance such as when additional cost may be involved, and current commercially relevant values may be for example, 270 ohms/sq, versus 150 ohms/sq, versus 100 ohms/sq, versus 50 ohms/sq, versus 40 ohms/sq, versus 30 ohms/sq or less as target values for different quality and/or size touch screens, and each of these values defines a range between the specific values as end points of the range, such as 270 ohms/sq to 150 ohms/sq, 270 ohms/sq to 100 ohms/sq, 150 ohms/sq to 100 ohms/sq and the like with 15 particular ranges being defined. Thus, lower cost films may be suitable for certain applications in exchange for modestly higher sheet resistance values. In general, sheet resistance can be reduced by increasing the loading of nanowires, but an increased loading may not be desirable from other perspectives, and metal loading is only one factor among many for achieving low values of sheet resistance.

For applications as transparent conductive films, it is desirable for the fused metal nanowire networks or other sparse metal conductive layer to maintain good optical transparency. In principle, optical transparency is inversely related to the loading with higher loadings leading to a reduction in transparency, although processing of the network can also significantly affect the transparency. Also, polymer binders and other additives can be selected to maintain good optical transparency. The optical transparency can be evaluated relative to the transmitted light through the substrate. For example, the transparency of the conductive film described herein can be measured by using a UV-Visible spectrophotometer and measuring the total transmission through the conductive film and support substrate. Transmittance is the ratio of the transmitted light intensity (I) to the incident light intensity ($I_o$). The transmittance through the film ($T_{film}$) can be estimated by dividing the total transmittance (T) measured by the transmittance through the support substrate ($T_{sub}$). ($T=I/I_o$ and $T/T_{sub}=(I/I_o)/(I_{sub}/I_o)=I/I_{sub}=T_{film}$) Thus, the reported total transmissions can be corrected to remove the transmission through the substrate to obtain transmissions of a conductive layer, overcoat or other component alone. While it is generally desirable to have good optical transparency across the visible spectrum, for convenience, optical transmission can be reported at 550 nm wavelength of light. Alternatively or additionally, transmission can be reported as total transmittance from 400 nm to 700 nm wavelength of light, and such results are reported in the Examples below. In general, for the fused metal nanowire films, the measurements of 550 nm transmittance and total transmittance from 400 nm to 700 nm (or just "total transmittance" for convenience) are not qualitatively different. In some embodiments, the film formed by the fused network has a total transmittance (TT %) of at least 80%, in further embodiments at least about 85%, in additional embodiments, at least about 90%, in other embodiments at least about 94% and in some embodiments from about 95% to about 99%. Transparency of the films on a transparent polymer substrate can be evaluated using the standard ASTM D1003 ("Standard Test Method for Haze and Luminous Transmittance of Transparent Plastics"), incorporated herein by reference. A person or ordinary skill in the art will recognize that additional ranges of transmittance within the explicit ranges above are contemplated and are within the present disclosure. When adjusting the measured optical properties for the films in the Examples below for the substrate, the films have very good transmission and haze values, which are achieved along with the low sheet resistances observed.

The fused metal networks can also have low haze along with high transmission of visible light while having desirably low sheet resistance. Haze can be measured using a hazemeter based on ASTM D1003 referenced above, and the haze contribution of the substrate can be removed to provide haze values of the transparent conductive film. In some embodiments, the sintered network film can have a haze value of no more than about 1.2%, in further embodiments no more than about 1.1%, in additional embodiments no more than about 1.0% and in other embodiments from about 0.9% to about 0.2%. As described in the Examples, with appropriately selected silver nanowires very low values of haze and sheet resistance have been simultaneously achieved. The loading can be adjusted to balance the sheet resistance and the haze values with very low haze values possible with still good sheet resistance values. Specifically, haze values of no more than 0.8%, and in further embodiments from about 0.4% to about 0.7%, can be achieved with values of sheet resistance of at least about 45 ohms/sq. Also, haze values of 0.7% to about 1.2%, and in some embodiments from about 0.75% to about 1.05%, can be achieved with sheet resistance values of from about 30 ohms/sq to about 45 ohms/sq. All of these films maintained good optical transparency. A person of ordinary skill in the art will recognize that additional ranges of haze within the explicit ranges above are contemplated and are within the present disclosure.

With respect to the corresponding properties of the multilayered films, the additional components are generally selected to have a small effect on the optical properties, and various coatings and substrates are commercially available for use in transparent elements. Suitable optical coatings, substrates and associated materials are summarized above. Some of the structural material can be electrically insulating, and if thicker insulating layers are used, the film can be patterned to provide locations where gaps or voids through the insulating layers can provide access and electrical contact to the otherwise embedded electrically conductive element.

EXAMPLES

Example 1. High Concentration Synthesis of Silver Nanoplates (0.12 mg/mL) with 2-Step $H_2O_2$ Addition This example demonstrates the effective high concentration synthesis of the nanoplates and results are presented for a base synthesis process and for variations on the base process.

The effective scale up reaction is initially demonstrated using a citrate surfactant and glycerol stabilizing agent at a reaction volume roughly 60 times and a silver concentration about 12 times (12×) the values in a similar published procedure (Zhang JACS, supplemental materials page S29). Novel two-step addition of hydrogen peroxide is utilized to achieve such a high concentration synthesis of silver nanoplate. In this scaled up procedure, 1443 mL of DI (deionized) water was first added to a 4 L Erlenmeyer flask. Then 18 mL of aqueous silver nitrate solution (0.1 M), 30 mL of aqueous trisodium citrate solution (75 mM), 10 mL of aqueous glycerol solution (35 mM) and the first portion of hydrogen peroxide solution (30 wt. %) were added and the mixture solution vigorously stirred in air at room temperature. A 37.5 mL aqueous sodium borohydride (0.1 M) solution was rapidly injected into this mixture. The colloidal solution turned to a deep yellow color. Within the next several minutes, the color of the colloidal solution gradually changed to dark brownish. Then another 12 mL of hydrogen peroxide solution (30 wt. %) was added dropwise over about 5 minutes until the color of the colloidal solution turned blue. Stirring was continued for 20 minutes after completing the addition of hydrogen peroxide.

Figure 3:
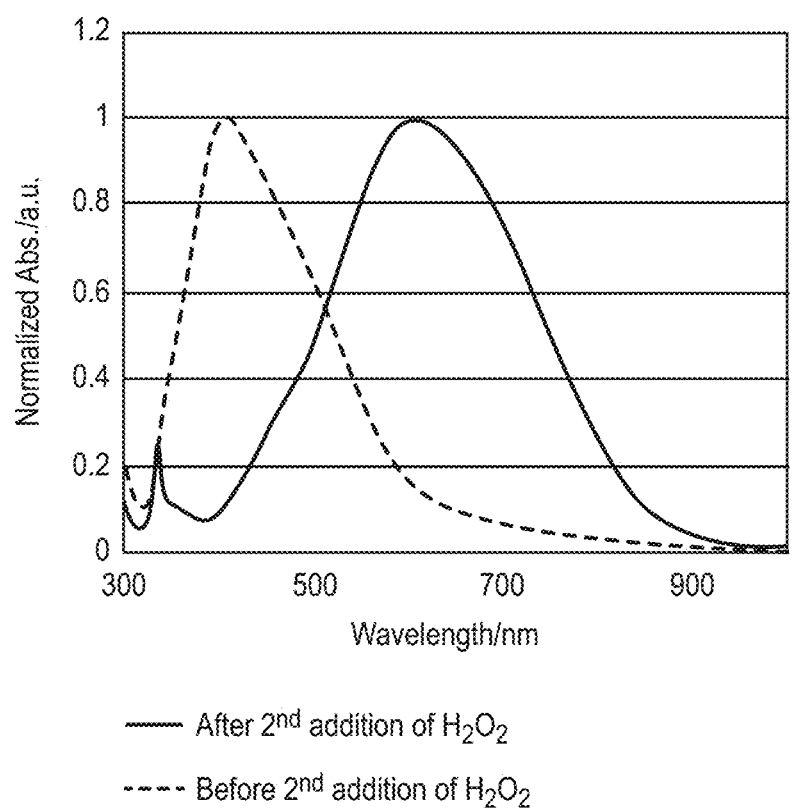
FIG. 3 is a plot of the normalized light absorption spectra for the solution after a first step of hydrogen peroxide addition and after a second addition of hydrogen peroxide when the silver nanoplates are formed.
Figure 4:
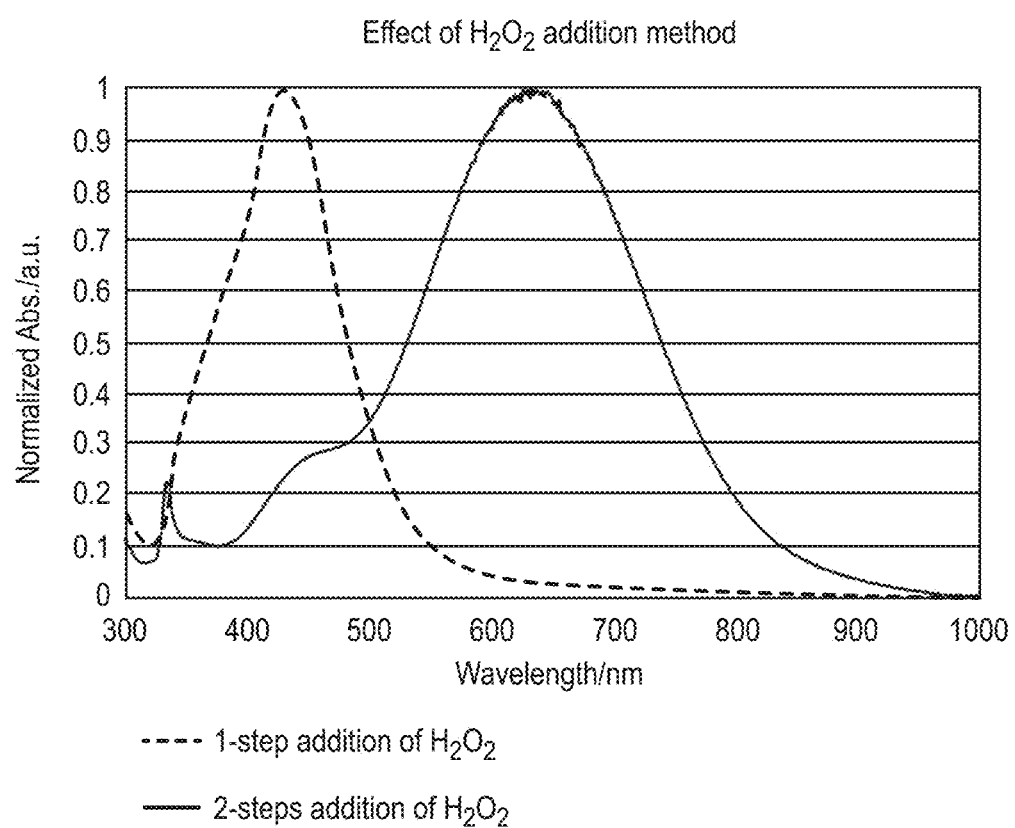
FIG. 4 is a plot of the normalized light absorption spectrum for silver nanoplates processed from silver solutions based on a two-step hydrogen peroxide addition compared with the corresponding reaction involving a single addition of hydrogen peroxide.
Figure 5A:
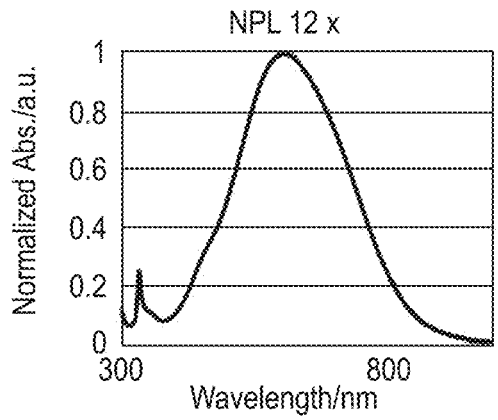
FIGS. 5A-5J are plots of normalized light absorption spectra for silver nanoplates synthesized using the methods of Example 1 at different silver concentrations (A=12×, B=16×, C=24×, D=32×, E=44×, F=68×, G=88×, H=100×, I=128×, and J=156×).
Figure 5B:
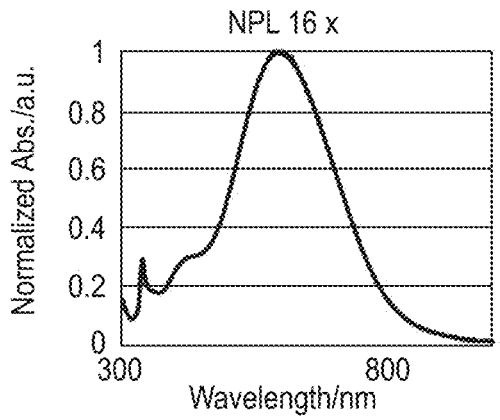
Figure 5C:
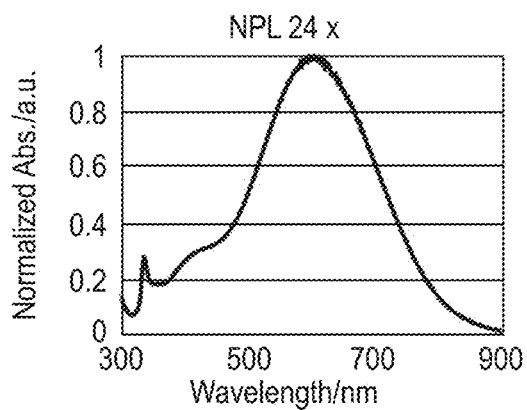
Figure 5D:
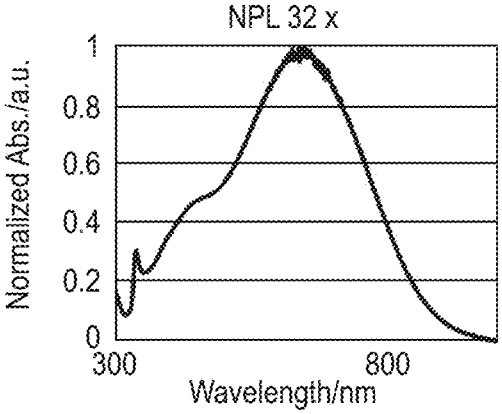
Figure 5E:
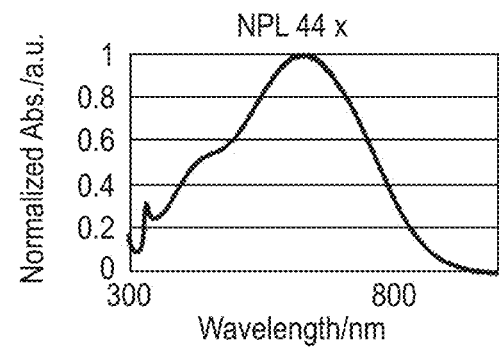
Figure 5F:
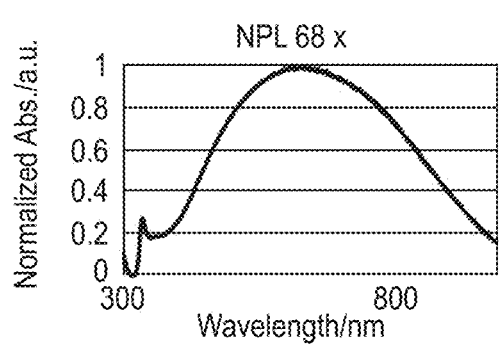
Figure 5G:
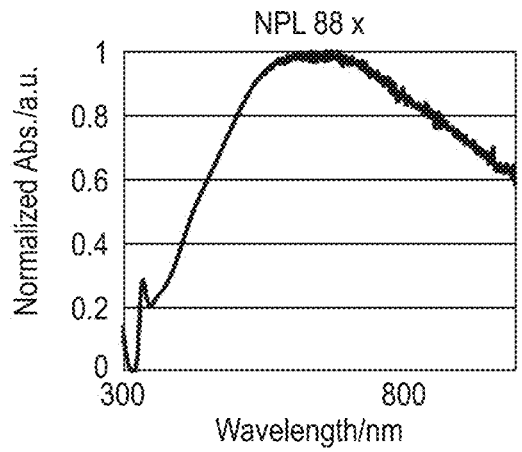
Figure 5H:
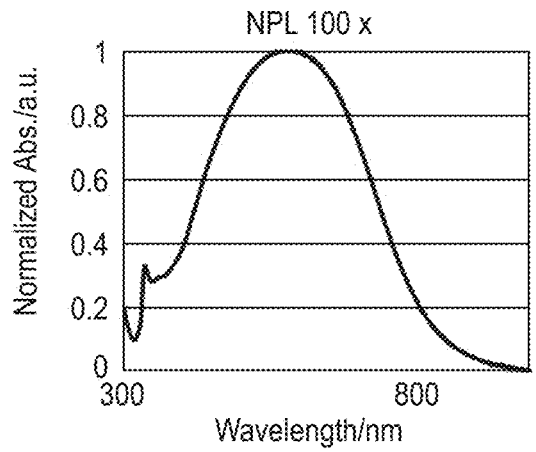
Figure 5I:
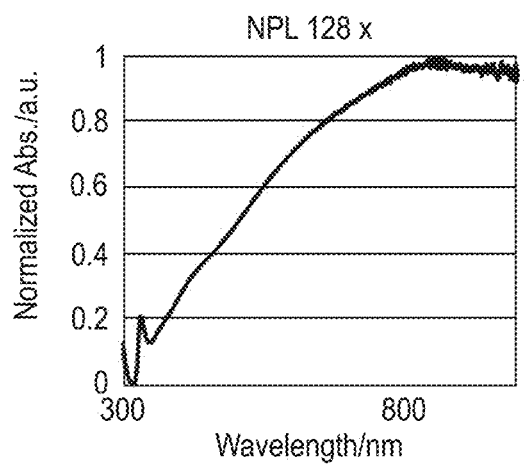
Figure 5J:
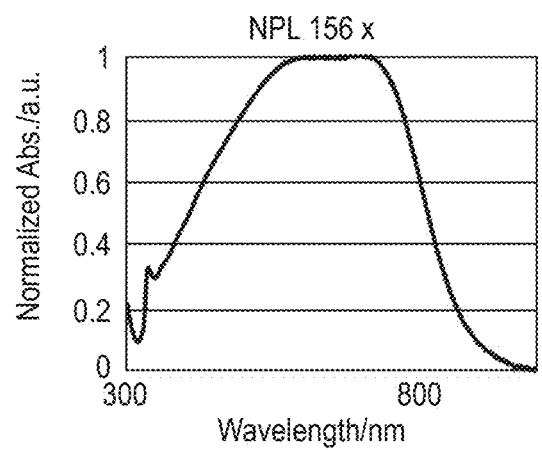

The volume of the second portion of hydrogen peroxide solution was used to assist formation of AgNPL with the target absorption peak. Referring to FIG. 3, the UV-visible absorption spectrum is shown for the solution before and after the dropwise addition of the second quantity of $H_2O_2$. The formation of silver nanoplates provides the characteristic shift of absorption peak to the red. If the hydrogen peroxide is all added into the initial reaction flask, then only silver nanoparticles are observed rather than the nanoplates. This difference in the product can be seen in FIG. 4 where absorption spectra are shown with all of the hydrogen peroxide added at once or with the two step addition with the second quantity added gradually. It is believed that the yield of nanoplates is close to 100%, although a few nanoparticles may be observed dispersed in the solution.

Example 2. High Concentration Synthesis of Silver Nanostructures (0.12 mg/mL) with 1-Step $H_2O_2$ Addition As a comparison to the 2-step $H_2O_2$ addition method in example 1, 1-step addition of $H_2O_2$ method was conducted to show the differences. The same procedure was followed as in Example 1 except that the combined amount of hydrogen peroxide solution (30 wt. %) from the first and second addition in Example 1 was used before the rapid injection of the aqueous sodium borohydride (0.1 M) solution. The colloidal solution turned to a deep yellow color after 30 minutes, indicating the formation of silver nanoparticles. The UV-vis spectra shown in FIG. 4 verifies the formation of only silver nanoparticles.

Example 3. Higher Concentration Synthesis of Silver Nanoplates (>0.12 mg/mL)

Successful nanoplate production has been achieved at even greater concentrations of silver, and it has been discovered that greater portions of the hydrogen peroxide needs to be added dropwise as the concentration is increased, and the relative amounts of stabilizing compounds should be adjusted to achieve desired nanoplate properties, as characterized by the absorption spectrum. It is believed that the absorption spectrum of the nanoplates is influenced by the nanoplate size and aspect ratios. For instance, to achieve the synthesis of silver nanoplates with a concentration of 0.68 mg/mL, 1443 mL of DI (deionized) water was first added to a 4 L Erlenmeyer flask. Then 10.2 mL of aqueous silver nitrate solution (1 M), 6 mL of aqueous trisodium citrate solution (0.75 M), 14 mL of aqueous glycerol solution (35 mM) and a first portion of hydrogen peroxide solution (30 wt. %) were added and the mixture solution vigorously stirred in air at room temperature. A 13.2 mL aqueous sodium borohydride (1 M) solution was rapidly injected into this mixture. The colloidal solution turned to a deep yellow color. Within the next several minutes, the color of the colloidal solution gradually changed to dark brownish. Then another 110 mL of hydrogen peroxide solution (30 wt %) was added dropwise until the color of the colloidal solution turned blue, indicating the formation of silver nanoplates.

The higher concentration synthesis reactions tend to form silver nanoplates with a broader range of nanoplate size. Different synthesis parameters for varied silver concentrations according to procedure similar to that in Example 1 are given in Table 1 below. UV-visible absorption spectra for a range of concentrations covering 10 values are shown in FIGS. 5A-5J for concentrations: 12× (A), 16× (B), 24× (C), 32× (D), 44× (E), 68× (F), 88× (G), 100× (H), 128× (I) and 156× (J). The results suggest that further optimization of the process may be helpful to narrow the size distribution while still achieving a desired synthesis scale. It is believed that the volume can be scaled up also.

TABLE 1

| Sample | $AgNO_3$/mL | $H_2O_2$ (30 wt %) $2^{nd}$ addition/mL | Estimated AgNPL Concentration (mg/mL) |
|---|---|---|---|
| 1× | 1.5; [0.1M] | 0 | 0.01 |
| 12× | 18; [0.1M] | 12 | 0.12 |
| 16× | 24; [0.1M] | 20 | 0.16 |
| 24× | 36; [0.1M] | 28 | 0.24 |
| 32× | 48; [0.1M] | 45 | 0.31 |
| 44× | 66; [0.1M] | 40 | 0.42 |
| 68× | 10.2; [1M] | 110 | 0.69 |
| 88× | 13.2; [1M] | 110 | 0.88 |
| 100× | 15; [1M] | 120 | 0.99 |
| 128× | 19.2; [1M] | 120 | 1.25 |
| 156× | 23.6; [1M] | 132 | 1.50 |

Figure 6:
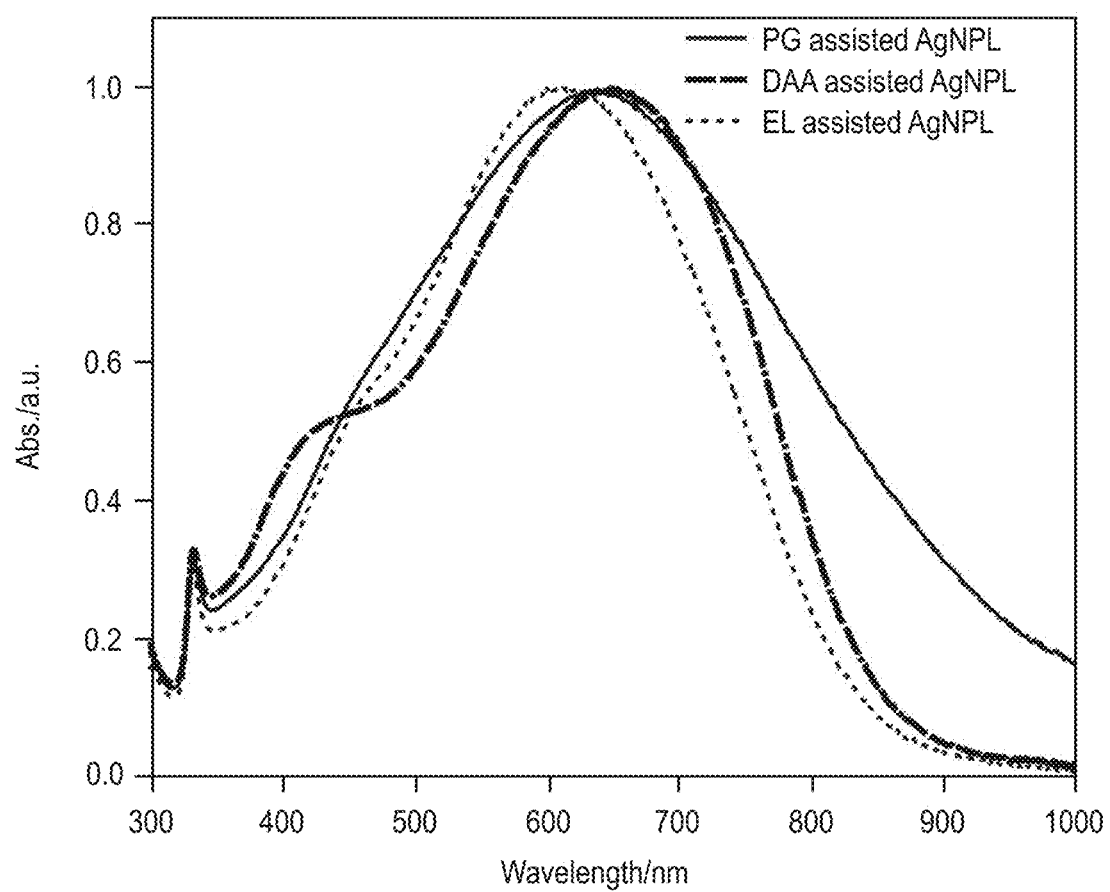
FIG. 6 is a plot of normalized light absorption for 3 samples of silver nanoplates synthesized with diacetone alcohol, ethyl lactate or propylene glycol as alternative stabilizing agents replacing glycerol.

A set of experiments were performed to test alternatives to the glycerol stabilizing compound. Specifically, propylene glycol, ethyl lactate and diacetone alcohol were substituted in the 12× protocol above and on equal mole basis. Good production of silver nanoplates was found for the propylene glycol and ethyl lactate stabilization compounds. For the diacetone alcohol compound, reasonable nanoplate synthesis was observed, but a greater portion of silver nanoparticles were produced. The UV-visible absorption spectra for the three samples is shown in FIG. 6.

Example 4. Coating Silver Nanoplates with a Thin Shell of Gold

This example demonstrated the noble metal coating of silver nanoplates and the optical properties of the resulting gold coated nanoplates.

The as-prepared solution of silver nanoplates from Example 1 was used for coating without purification. 6 g of polyvinylpyrrolidone (PVP, MW 40,000), 1.32 g of trisodium citrate, 12 mL of diethyl amine, and 24 mL ascorbic acid aqueous solution (0.5 M) were added to the silver nanoplate solution (12×) from example 1. The trisodium citrate was important to prevent large blue shift of the absorption peak of the silver nanoplates during the gold coating process. A separate coating solution for gold coating was prepared by mixing 6 mL of PVP (5 wt %), 1.2 mL KI aqueous solution (0.2 M) and 300 μL of HAuCl$_4$ aqueous solution (0.25 M) with 45 mL of DI water. The gold coating solution was slowly added to the silver nanoplate colloidal solution by a syringe pump at a rate of 0.2 mL/min. A layer of gold was deposited on the surface of silver nanoplates. The thickness of gold layer can be controlled by the amount of gold growth solution. The gold coated silver nanoplates were collected and washed with DI water 2 times and stored at room temperature for future use.

Figure 7:
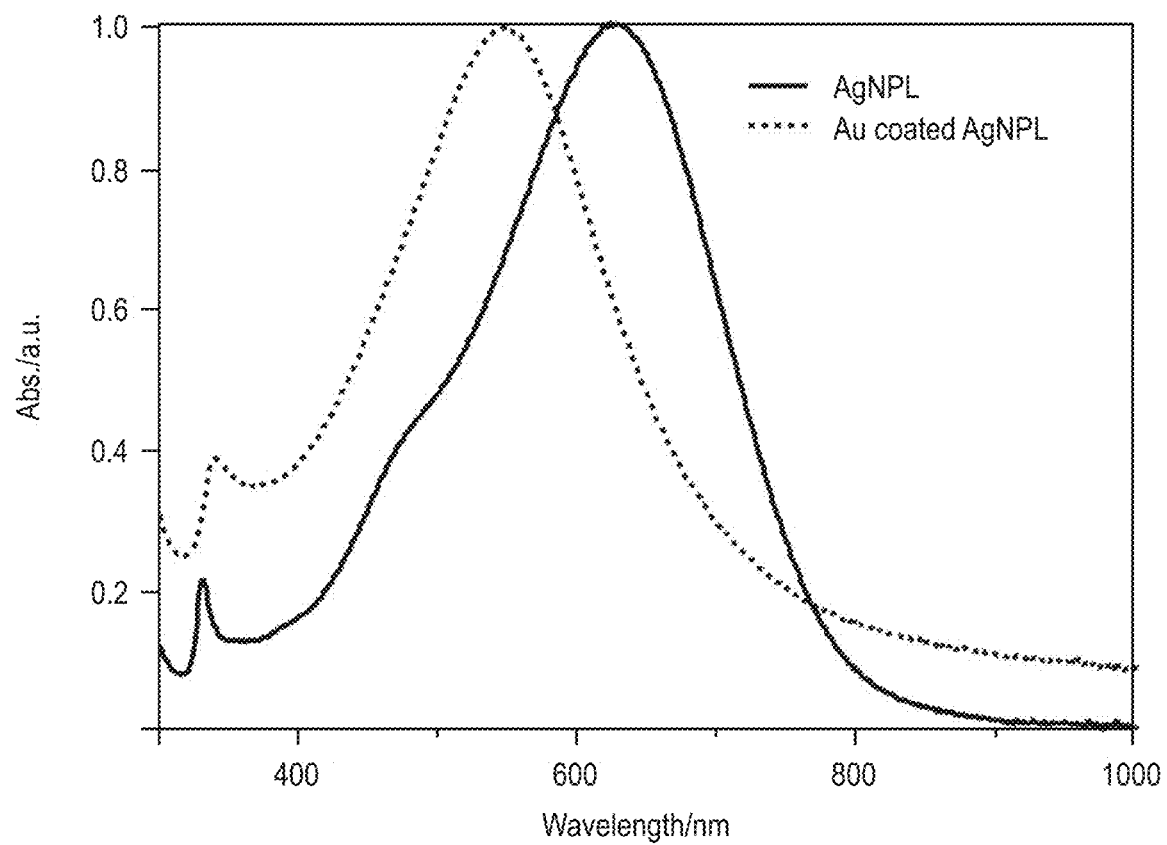
FIG. 7 is a plot of normalized light absorption for representative samples of silver nanoplates synthesized in Example 1 and of gold coated silver nanoplates synthesized as described in Example 2.
Figure 8:
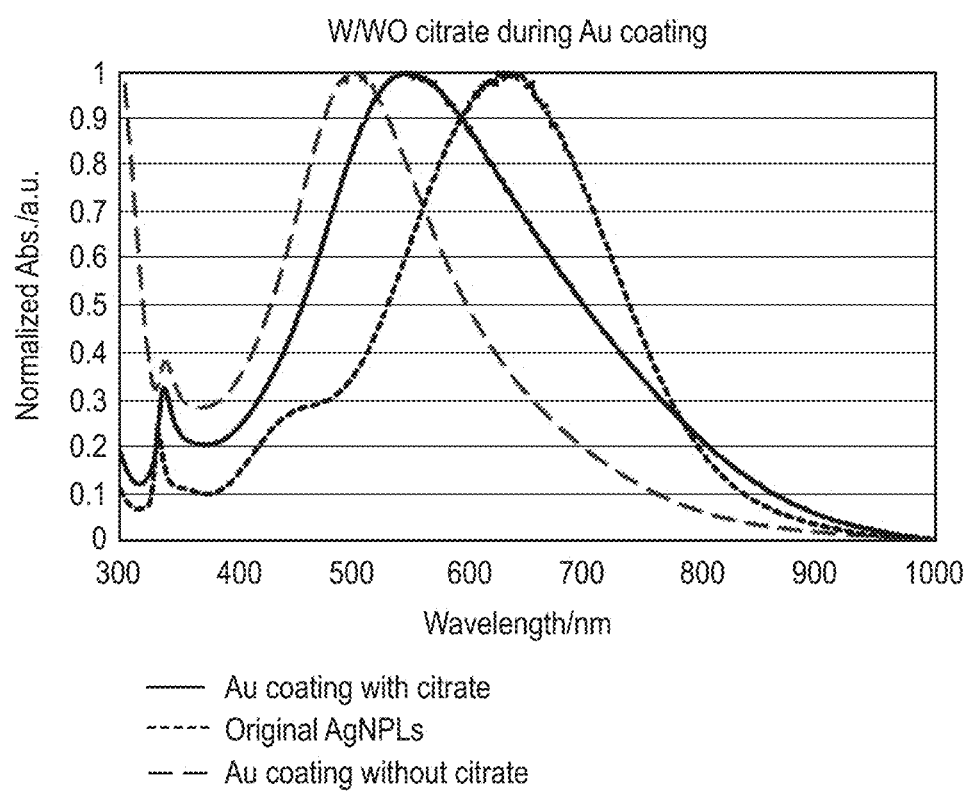
FIG. 8 is a plot of normalized light absorption for as synthesized silver nanoplates, gold coated silver nanoplates formed with added citrate during the coating process, and gold coated silver nanoplates formed without added citrate during the coating process.
Figure 9:
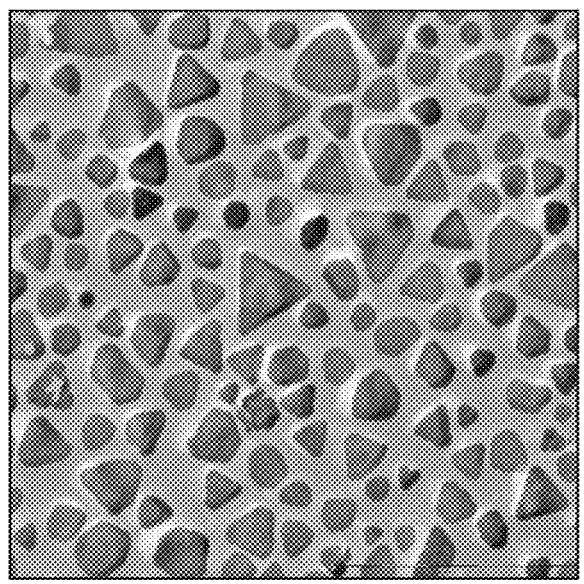
FIG. 9 is a transmission electron micrograph of typical gold coated silver nanoplates.

The absorption spectra of the silver nanoplates and gold coated silver nanoplates are shown in FIG. 7. The gold coating shifted the absorption spectrum peak to smaller wavelengths and increased the red absorption tail. The effect of the citrate added during the coating process is shown in FIG. 8, where absorption spectra are shown for the uncoated nanoplates, gold coated nanoplates formed with the added citrate and gold coated nanoplates without additional citrate. The silver nanoplates that were coated without the added citrate had a significantly greater shift to lower wavelengths and had large blue absorption. Typical transmission electron micrograph of gold coated nanoplates is shown in FIG. 9. After the gold coating, most of the nanoplates were intact and only a small portion of the silver nanoplates had been etched with holes in the plane. Based on the micrographs, the surface of the gold coated nanoplates was not smooth on an atomic scale.

Experiments were conducted to examine the reproducibility of the gold coated silver nanoplate synthesis. These experiments confirmed the reproducibility of both the silver nanoplate synthesis as well as the gold coating process. Referring to Table 2, the synthesis steps were repeated 7 times with the same reaction parameters, which are presented above. The peak absorption wavelength for the silver nanoplates and the gold coated silver nanoplates is shown in Table 2. The window of the absorption peak for the gold coated silver nanoplates was from about 539 nm to about 580 nm.

TABLE 2

| Sample # | Au thickness (μL Coating Solution) | AgNPL/Abs. Peak (nm) | Ag@AuNPL/Abs. Peak (nm) |
|---|---|---|---|
| 1 | Au-300 | 636 | 555 |
| 2 | Au-300 | 645 | 552 |
| 3 | Au-300 | 628 | 540 |
| 4 | Au-300 | 635 | 539 |
| 5 | Au-300 | 635 | 550 |
| 6 | Au-300 | 657 | 580 |
| 7 | Au-300 | 645 | 570 |

Figure 10:
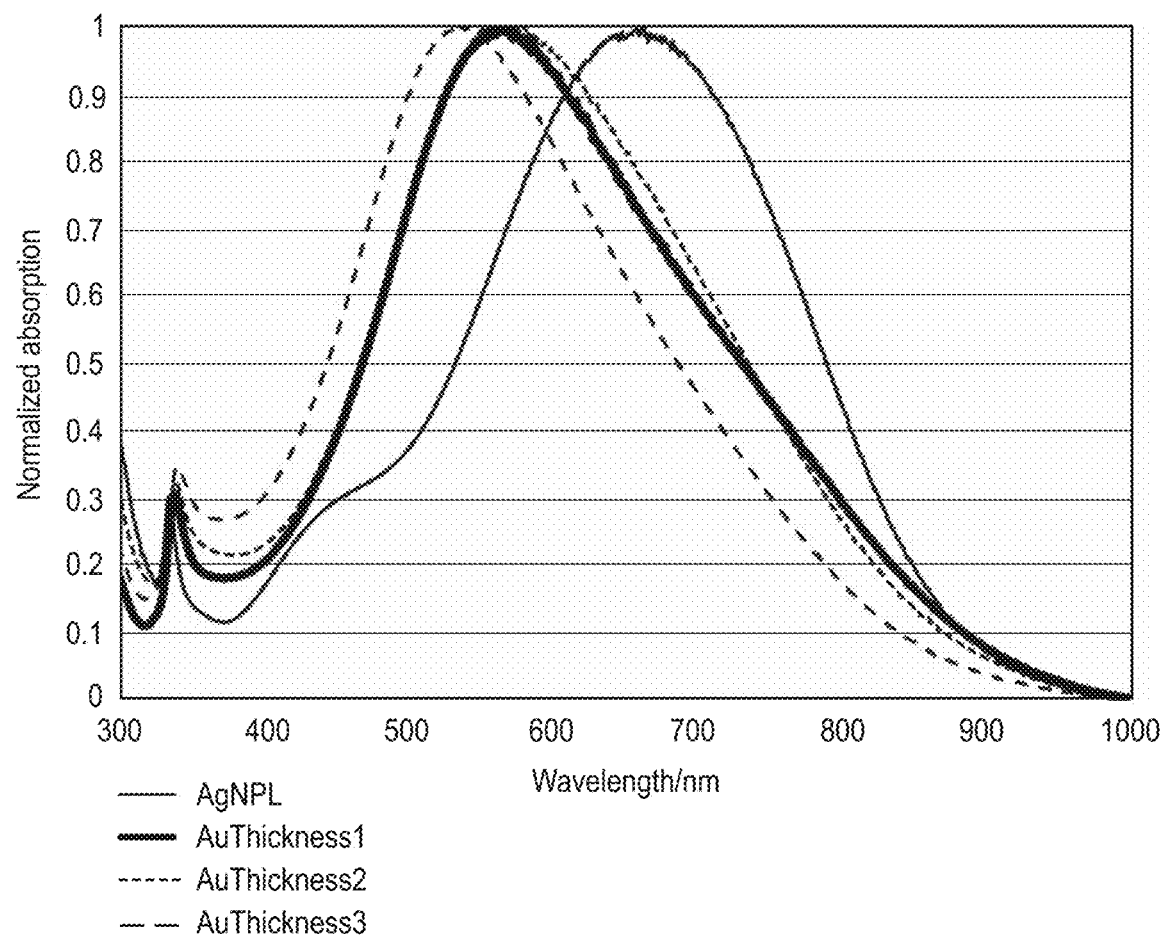
FIG. 10 is a plot of light absorption for uncoated silver nanoplates and for three sets of gold coated silver nanoplates with different gold coating thicknesses.

Thickness of the gold coating can be controlled by the amount of gold coating precursor. The synthesis is according to procedure similar to that in Example 4 except the total amount of coating solution of gold complex and the reducing agent are varied. The absorption spectra of typical gold coated silver nanoplates with different thicknesses are given in FIG. 10.

Example 5. Stability of (Gold Coated) Silver Nanoplates in Solution

The stability of the nanoplates with respect to various temperature conditions was examined.

Figure 11:
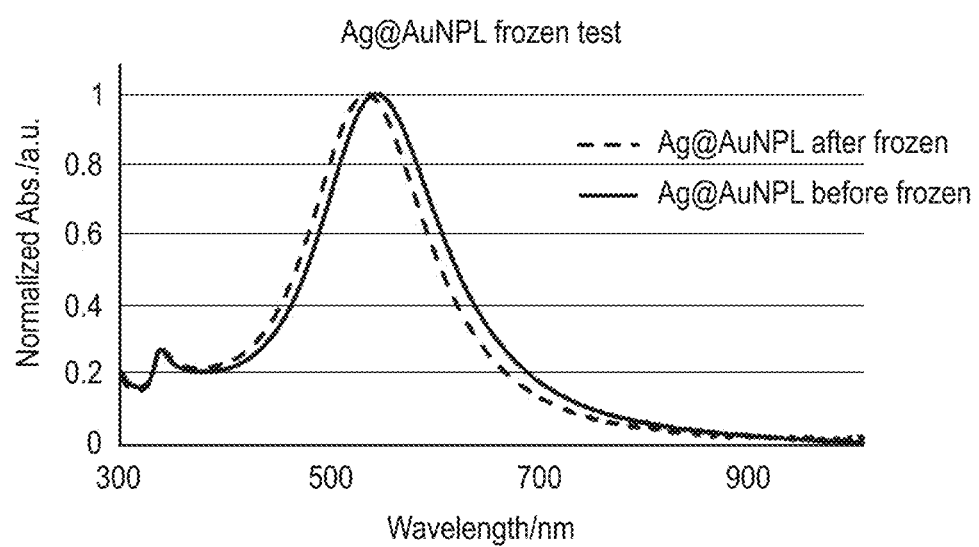
FIG. 11 is plot of light absorption for gold coated silver nanoplates before freezing and after a freeze-thaw cycle.
Figure 12:
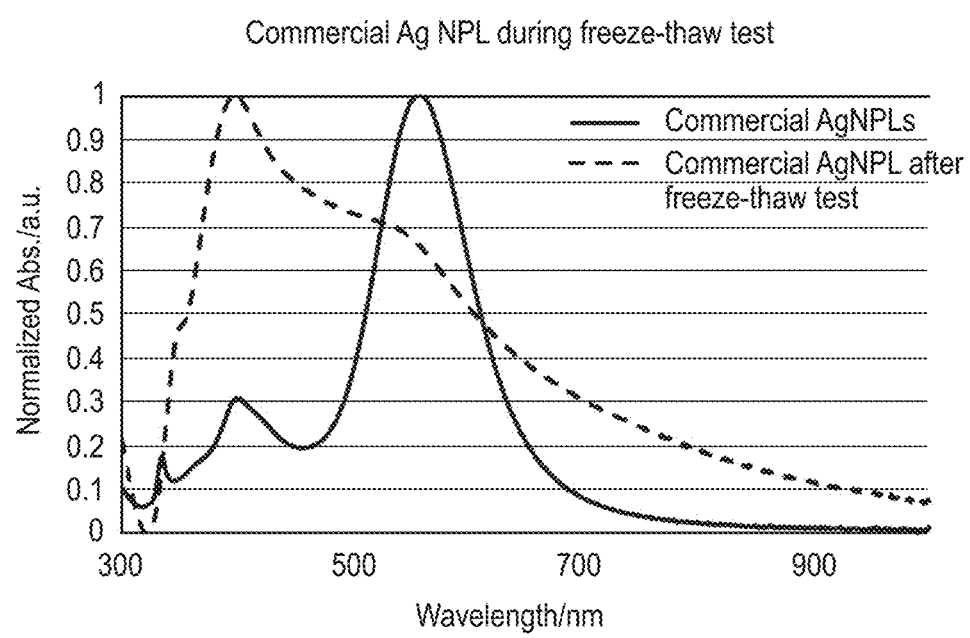
FIG. 12 is a plot of light absorption for the PVP coated commercial silver nanoplates before freezing and after a freeze-thaw cycle.

In a first test, the gold coated silver nanoplates were frozen and thawed. The before freezing and after thawing UV-visible absorption spectra are shown in FIG. 11. The thawed Au coated Ag nanoplates had a similar absorption spectrum with just a roughly 10 nm shift to lower wavelengths. For comparison, PVP coated commercial silver nanoplates were similarly treated. The absorption spectrum of the PVP coated silver nanoplates before freezing and the corresponding absorption spectrum after thawing are shown in FIG. 12. The thawed polymer coated Ag nanoplates exhibited a dramatic shift and change in the shape and position of the absorption spectra suggestive of conversion to silver nanoparticles. Thus, the gold coating substantially improved the nanoplate stability with respect to freezing.

Figure 13:
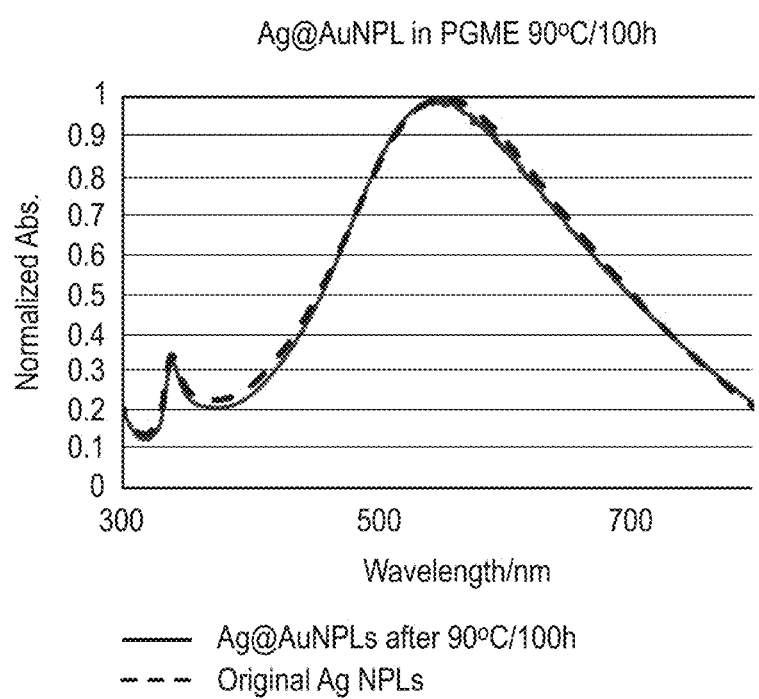
FIG. 13 is a plot of light absorption for gold coated silver nanoplates dispersed in propylene glycol monomethyl ether before heating and after heating for 100 hours at 90° C.
Figure 14:
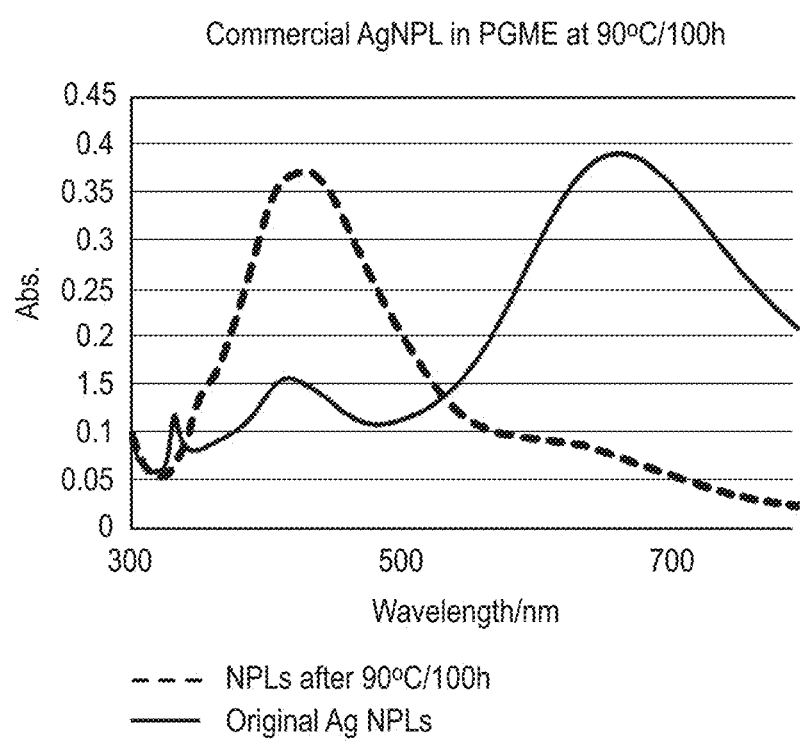
FIG. 14 is a plot of light absorption for uncoated silver nanoplates dispersed in propylene glycol monomethyl ether before heating and after heating for 100 hours at 90° C.

In a further set of experiments, the concentrated gold coated silver nanoplate colloidal solution and the aqueous silver nanoplate colloidal solution were separately diluted in propylene glycol monomethyl ether (PGME) at 1:9 v/v ratio, and then heated at up to 90° C. The color and absorption peak position were monitored by UV-vis spectrometer after 100 hours. The gold coated silver nanoplates were very stable in PGME at elevated temperatures. Only a slight blue shift was observed during the initial 2 h of test and then no further shift was seen in the next 100 hours (FIG. 13). On the contrary, the uncoated silver nanoplates changed color quickly to yellow under the same condition, which indicated the formation of silver nanoparticles from the original silver nanoplates, as verified by the UV-vis spectra before and after the heating test (FIG. 14).

Example 6. Stability of (Gold Coated) Silver Nanoplates in Film Coatings

This example demonstrates the effects on hue of polymer coatings with silver nanoplates and the stability of the hue adjustment is also shown.

Some examples involve silver nanoplates associated with fused metal conductive networks that result in the formation in a transparent conductive film. Examples are presented with the silver nanoplates in the conductive layer with the fused metal nanostructured network or in a coating placed over the layer with the fused metal nanostructured network. The fused metal nanostructured network was formed using silver nanowires synthesized using a polyol process using PVP polymer. In general, the inclusion of appropriate amounts of silver nanoplates can significantly decrease b* without degrading other properties unacceptably.

The testing described herein involves the formation of a fused metal nanostructured network on a PET polyester substrate, 125 micron thick sheet. The fused metal nanostructured network was formed with a single ink comprising silver nanowires with a fusing composition. A polymer hard coating was applied over the fused metal nanostructured network.

Silver nanowires were used in the following examples with an average diameter of between 25 and 50 nm and an average length of 10-30 microns. The silver nanowire ink was essentially as described in Example 5 of U.S. Pat. No. 9,183,968 to Li et al., entitled "Metal Nanowire Inks for the Formation of Transparent Conductive Films with Fused Networks," incorporated herein by reference. The metal nanowire ink comprised silver nanowires at a level between 0.1 to 1.0 wt %, between 0.05 mg/mL and 2.5 mg/mL silver ions, and a cellulose based binder at concentrations from about 0.01 to 1 wt %. The silver nanowire inks were aqueous solutions with a small amount of alcohol. The ink was slot coated onto the PET film. After coating the nanowire inks, the films were then heated in an oven at 100-120° C. for 5-10 min to dry the films.

For some films, the total transmission (TT) and haze of the film samples were measured using a Haze Meter. To adjust the haze measurements for the samples below, a value of substrate haze can be subtracted from the measurements to get approximate haze measurements for the transparent conductive films alone. The instrument is designed to evaluate optical properties based on ASTM D 1003 standard ("Standard Test Method for Haze and Luminous Transmittance of Transparent Plastics"), incorporated herein by reference. The total transmission and haze of these films include PET substrate which has base total transmission and haze of 92.1-92.9% and 0.1%-0.4%, respectively. In the following examples, two different formulations of fusing metal nanowire inks are presented along with optical and sheet resistance measurements. CIELAB values of b* and a* were determined using commercial software from measurements made with a Konica Minolta Spectrophotometer CM-3700A with SpectraMagic™ NX software. Sheet resistance was measured with a 4-point probe method or a contactless resistance meter.

Figure 15:
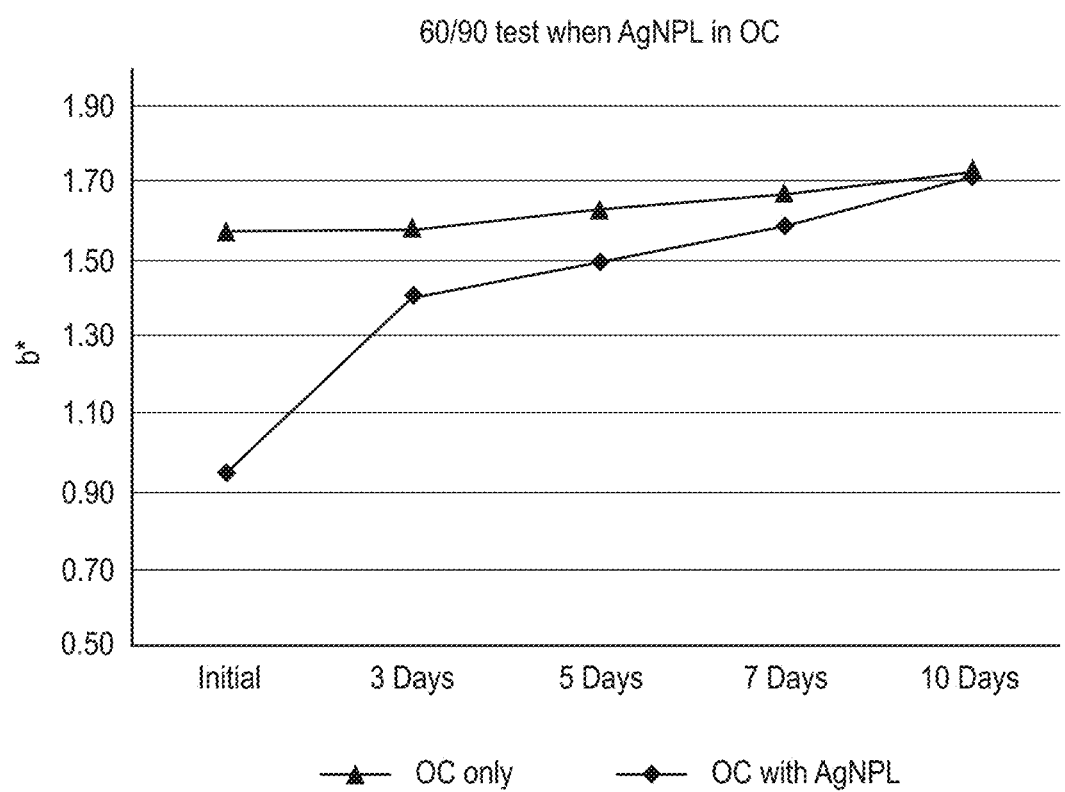
FIG. 15 is a plot of b* value as a function of days of storage at 60° C. and 90 percent relative humidity for transparent conductive ink film with a polymer hardcoat or with a polymer hardcoat loaded with silver nanoplates.
Figure 16:
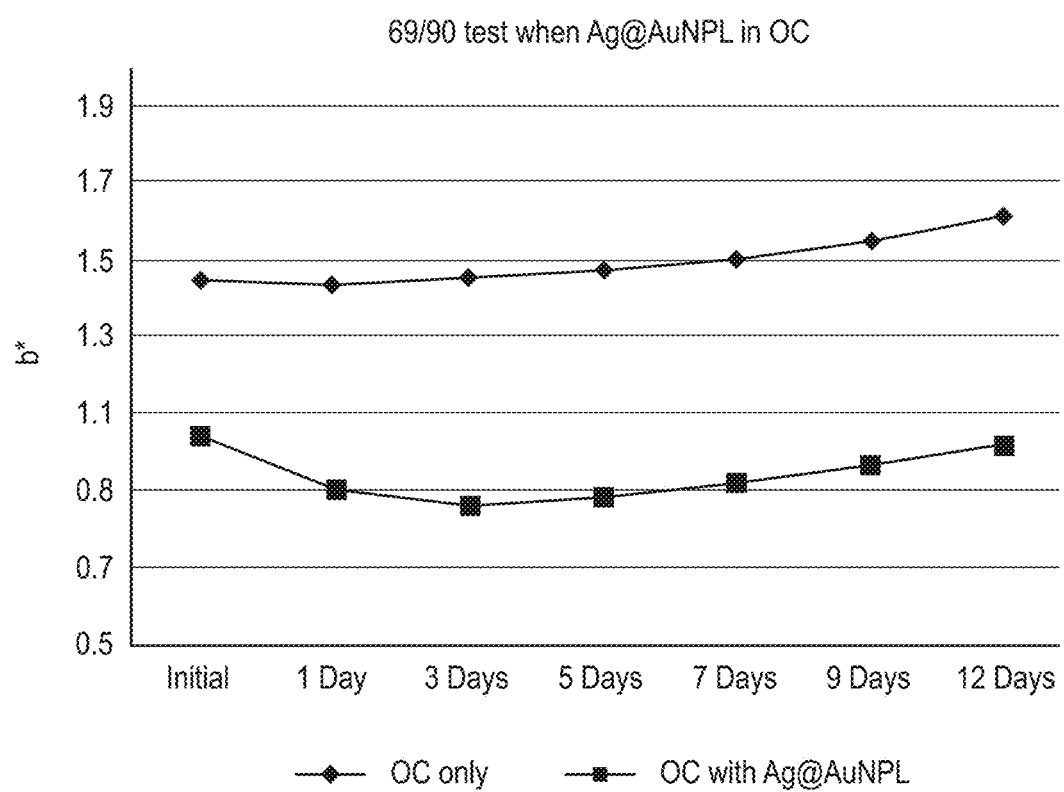
FIG. 16 is a plot of b* value as a function of days of storage at 60° C. and 90 percent relative humidity for a transparent conductive ink film with a polymer hardcoat or with a polymer hardcoat loaded with gold coated silver nanoplates.

In a first set of stability measurements, gold coated nanoplates (300 μL Au coating) and corresponding non-coated silver nanoplates were used as prepared in Examples 1 and 4. The nanoplates were dispersed in a hardcoat precursor solution and slot coated at an estimated wet thickness of 25 microns over a fused metal nanostructured network. The coated acrylic polymer was dried and UV crosslinked. The samples were then tested in a controlled environment chamber kept at 60° C. and 90% relative humidity (60/90 test). The value of b* was measured for these films over 10 days. A third sample, prepared without nanoplates in the overcoats was tested as a reference. The absolute increase in b*, Δb*, of the samples containing silver nanoplates as compared to that of the reference sample was considered as a measure of the contribution due to the nanoplates' changes. The results of b* are plotted in FIGS. 15 (uncoated) and 16 (Au coated). A smaller difference in Δb* suggests higher stability of the nanoplates, while larger Δb* differences indicate more contribution from the degradation of silver nanoplates and thus low stability. According to the plot, the gold coated silver nanoplates were more stable than the uncoated silver nanoplates in the overcoat in this durability test.

Figure 17:
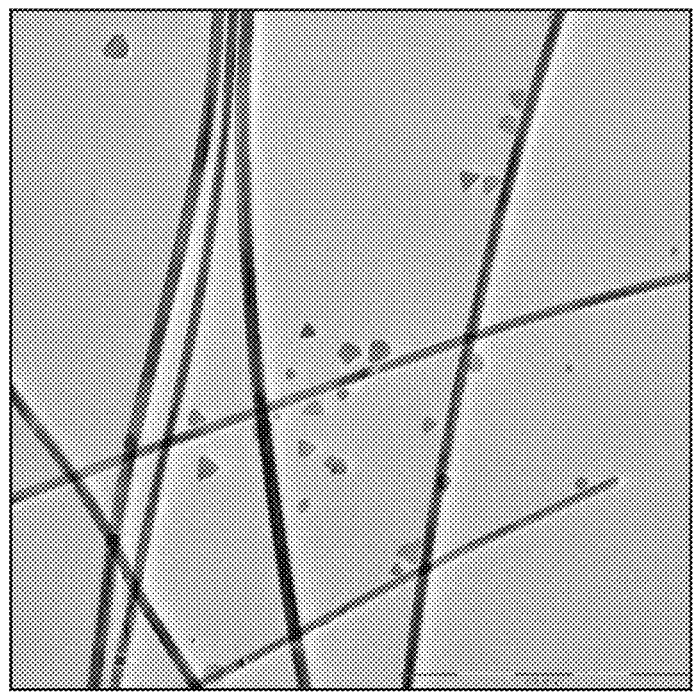
FIG. 17 is a transmission electron micrograph of typical gold coated silver nanoplates well dispersed in an electrically conductive fused metal nanostructured network.
Figure 18:
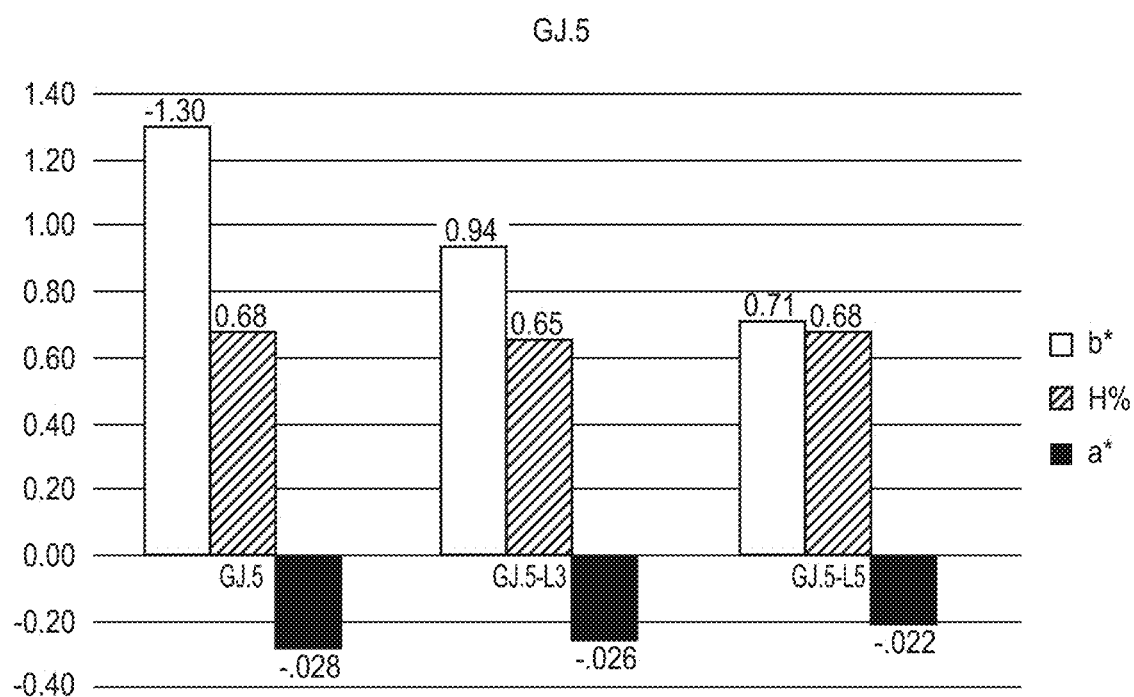
FIG. 18 is a set of three histogram plots for sample of an electrically conductive fused metal nanostructured network including increasing amounts of silver nanoplates included in the conductive layer along with a polymer binder with histogram plots of b*, a* and haze.

In another set of experiments, gold coated silver nanoplates were added to the ink for forming the conductive layer. The nanoplates were well dispersed in the ink layer, as demonstrated by the TEM image in FIG. 17. For the test, 3 samples were made: one control and two samples with different amount of gold coated silver nanoplates (550 nm peak absorption). Color measurements, and haze were compared between the films. The results are presented in FIG. 18. The haze values in percent in plot were averages across the film. As shown in FIG. 18, inclusion of the gold coated silver nanoplates decreased b* without degrading other properties unacceptably. The inclusion of gold coated silver nanoplates with 550 nm absorption peak did not significantly increase the absolute value of a*.

Three additional samples were made with gold coated silver nanoplates with different absorption peaks that were included in the conductive inks. A control film was formed without nanoplates. The films were processed as described above. Sheet resistance measurements and optical properties of the resulting films are presented in Table 3. The transparency decreased somewhat for the films with the nanoplates, but the values of b* decreased desirable amounts along with the absolute value of a*.

TABLE 3

The Effect of Gold Coated Silver Nanoplates with Different Absorption Peak in the Conductive Layer

| Sample | Sheet Resistance (ohms/sq) | TT % | H % | b* | a* | Peak Absorbance (1:60 v/v dilution) | Abs Peak/ nm |
|---|---|---|---|---|---|---|---|
| A | 46.3 | 89.3 | 1.20 | 0.75 | −0.11 | 1.46 | 555 |
| B | 46.3 | 89.0 | 1.17 | 0.83 | 0.04 | 1.58 | 537 |
| C | 44.7 | 89.2 | 1.18 | 0.77 | −0.18 | 1.52 | 574 |
| Control | 45.5 | 91.5 | 1.19 | 1.32 | −0.29 | | |

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method for applying a noble metal coating onto a silver nanoplate, the method comprising:
   providing an unpurified solution of silver nanoplates in which the silver nanoplates were synthesized;
   forming a reaction solution comprising the unpurified solution of silver nanoplates, a polycarboxylate anion, a polymer capping agent, a ligand, and a reducing agent, wherein the total concentration of silver in all forms is at least about 0.75 mM; and
   gradually adding a coating solution comprising an aqueous solution of complexed noble metal ions and a polymer capping agent to the reaction solution.

2. The method of claim 1 wherein the noble metal ions comprise gold ions and/or platinum ions.

3. The method of claim 1 wherein the complexed noble metal ions comprise iodide ion, bromide ion, sulfite, CN⁻, SCN⁻, thiosulfate, or a mixture thereof, as a complexing agent.

4. The method of claim 1 wherein the polycarboxylate anion is citrate, succinate, citramalate, malonate, tartrate, ioscitrate, cis-aconate, tricarballylate or a combination thereof.

5. The method of claim 1 wherein the polymer capping agent in the coating solution and/or the polymer capping agent in the reaction solution comprise polyvinylpyrrolidone.

6. The method of claim 1 wherein the ligand comprises nitrite, diethyl amine, ethylene diamine, nitrilotriacetic acid, iminobis(methylene phosphonic acid), aminotris(methylene phosphonic acid), ethylene diamine tetraacetic acid (EDTA), 1,3-propylenediaminetetraacetic acid (1,3-PDTA), triethylene tetramine, tri(2-aminoethyl) amine, diethylenetriaminepentaacetic acid, 1,2-cyclohexanediaminotetraacetic acid, iminodiacetic acid, methyliminodiacetic acid, N-(2-acetamide) iminoacetic acid, N-(2-carboxyethyl) iminodiacetic acid, N-(2-carboxymethyl)imino dipropionic acid, picolinic acid, dipicolinic acid, histidine, or combinations thereof.

7. The method of claim 1 wherein the reducing agent comprises sodium borohydride, ascorbic acid, oxalic acid, tartaric acid, hydroxyl amines, formic acid or mixtures thereof.

8. The method of claim 1 wherein the reaction solution comprises the polycarboxylate anion at a concentration of from about 0.00075M to about 0.05M.

9. The method of claim 8 wherein the silver nanoplates are synthesized from a solution comprising a polycarboxylate anion at a concentration of from about 0.0003M to about 0.005M.

10. The method of claim 8 wherein the polymer capping agent in the reaction solution is present in an amount of from about 0.005 wt % to about 5 wt %, and the reaction solution comprises the ligand at a concentration of 0.004M to about 1.5M, and the reducing agent at a concentration of from about 0.001M to about 0.1M.

11. The method of claim 1 wherein the coating solution comprises the complexed noble metal ions at a concentration of from about 0.0002 to about 0.02M and the polymer capping agent in the coating solution is present in an amount of from about 0.05 to about 5 wt %.

\* \* \* \* \*